United States Patent

Narayanan et al.

[11] Patent Number: 6,113,450
[45] Date of Patent: Sep. 5, 2000

[54] SEAL MATERIAL FRIT FRAME FOR FLAT PANEL DISPLAYS

[75] Inventors: Kollengode S. Narayanan, Cupertino; Masyood M. Akhtar; Raymond G. Capek, both of San Jose; James G. Richardson, Palo Alto; Theodore S. Fahlen, San Jose; Dmitriy Krupetskiy; Valeriy Karmanov, both of San Francisco; Al L. Urquhart, San Jose; Darrel J. Guidry, San Jose; Lawrence Serrano, San Jose, all of Calif.

[73] Assignee: Candescent Technologies Corporation, San Jose, Calif.

[21] Appl. No.: 09/079,503

[22] Filed: May 14, 1998

[51] Int. Cl.[7] .................................................. H01J 9/26
[52] U.S. Cl. .................................................. 445/25; 65/58
[58] Field of Search .............................. 445/25, 24; 65/58, 65/17.3, 17.6

[56] References Cited

U.S. PATENT DOCUMENTS

| | | | |
|---|---|---|---|
| 2,032,003 | 2/1936 | Clause | 49/81 |
| 3,778,126 | 12/1973 | Wilson | 445/25 |
| 4,158,485 | 6/1979 | Mueller et al. | 445/25 |
| 4,532,222 | 7/1985 | Butt | 501/32 |
| 5,672,083 | 9/1997 | Curtin et al. | 445/25 |
| 5,785,569 | 7/1998 | Stansbury et al. | 445/25 |
| 5,853,446 | 12/1998 | Carre et al. | 65/17.3 |

Primary Examiner—Kenneth J. Ramsey
Attorney, Agent, or Firm—Wagner, Murabito & Hao LLP

[57] ABSTRACT

Seal material bars and methods for forming seal material bars, a seal material frame and a method for forming a seal material frame, and a method for forming a flat panel display. Bars of seal material are made by extruding a mixture of glass frit and organic compound. In one embodiment, the glass frit bars have joining features formed in them. Ceramic material is also extruded so as to form seal material bars. The seal material bars are placed between the backplate and the faceplate and glass frit slurry is placed between adjoining seal material bars. Alternatively, seal material bars having joining features are used by mating joining features of adjoining seal material bars. A heating step melts the seal material so as to form a sealed interior region. Alternatively, the bars of seal material are used to form a seal material frame that is disposed between the faceplate and the backplate. The seal material frame may be formed using seal material bars with glass frit slurry disposed between adjoining seal material bars. Alternatively, the seal material frame is formed using seal material bars that have joining features.

83 Claims, 29 Drawing Sheets

SEAL MATERIAL FRIT FRAME FOR FLAT PANEL DISPLAYS

TECHNICAL FIELD

The present claimed invention relates to the field of flat panel displays. More specifically, the present claimed invention relates to a flat panel display and methods for forming a flat panel display having a seal formed using seal material.

BACKGROUND ART

A Cathode Ray Tube (CRT) display generally provides the best brightness, highest contrast, best color quality and largest viewing angle of prior art displays. CRT displays typically use a layer of phosphor that is deposited on a thin glass faceplate. These CRTs generate a picture by using one to three electron beams that generate electrons that are scanned across the phosphor in a raster pattern. The phosphor converts the electron energy into visible light so as to form the desired picture. However, prior art CRT displays are large and bulky due to the large vacuum tubes that enclose the cathode and extend from the cathode to the faceplate of the display. Therefore, typically, other types of display technologies such as active matrix liquid crystal display, plasma display and electroluminiscent display technologies have been used in the past to form thin displays.

Recently, a thin flat panel display has been developed that uses the same process for generating pictures as is used in CRT devices. These thin flat panel displays use a backplate including a matrix structure of rows and columns of electrodes. One such flat panel display is described in U.S. Pat. No. 5,541,473 titled GRID ADDRESSED FIELD EMISSION CATHODE that is incorporated herein by reference as background material. Typically, the backplate is formed by depositing a cathode structure (electron emitting) on a glass plate. The cathode structure includes emitters that generate electrons. The backplate typically has an active area within which the cathode structure is deposited. Typically, the active area does not cover the entire surface of the glass plate, leaving a thin strip that extends around the glass plate. Electrically conductive traces extend through the thin strip to allow for connectivity to the active area.

Prior art flat panel displays include a thin glass faceplate having one or more layers of phosphor deposited over the interior surface thereof. The faceplate is typically separated from the backplate by about 0.1 to 2 millimeters. The faceplate includes an active area within which the layer (or layers) of phosphor is deposited. A thin strip that does not contain phosphor extends from the active area to the edges of the glass plate. The faceplate is attached to the backplate using a glass seal.

In one prior art process, glass frit bars are placed within the thin strip in a frame-shape such that the glass frit bars surround the active area of the faceplate. The backplate is then placed over the faceplate. The flat panel display assembly is then aligned and tacked so as to hold the faceplate and the backplate in their proper alignment. Typically, four tacks are used, one in each corner of the flat panel display assembly. The thickness of the frit bars is less than the distance between the faceplate and the backplate such that there is a gap between the top of the glass frit and the bottom of the faceplate. This gap is typically about one to two thousandths of an inch.

The assembly is then placed in an oven and heated to the bias temperature of the glass frit bars (this is done to minimize stress fracturing resulting from the sudden increase in temperature). A laser is then used to melt the glass frit. The heat of the laser melts the glass frit locally and causes the glass frit to expand such that the glass frit contacts the backplate, wetting the surface of the backplate and forming a "bead." The laser is moved, drawing the bead around the surface of the glass frit until the desired seal is formed.

The melting of the glass frit forms an enclosure that is evacuated so as to produce a vacuum between the active area of the backplate and the active area of the faceplate. In operation, individual regions of the cathode are selectively activated to generate electrons which strike the phosphor so as to generate a display within the active area of the faceplate. These flat panel displays have all of the advantages of conventional CRT displays but are much thinner.

Prior art flat panel display fabrication processes often result in a defective seal between the faceplate and the backplate. Defective seals result from imprecise placement of glass frit bars. When glass frit bars are not properly placed, air is trapped between adjoining glass frit bars. This air forms an air bubble that later can rupture, causing a defect. In addition, defects result from the movement of glass frit bars during the laser heating process. That is, as the bead moves across the area to be sealed, friction from the movement of the bead causes movement of the glass frit bars. The movement can result in a defective seal and can cause the glass frit seal to intrude on the active areas of the faceplate and the backplate. In addition, defects occur as a result of movement of glass frit bars when the assembly is being placed into the oven.

Prior art methods for manufacturing glass frit bars are expensive and time consuming. In a typical prior art process for manufacturing glass frit bars, glass frit and organic material are mixed together. A ball mill grinding process is used to obtain the required mixing. Prior art process for mixing glass frit and organic compound requires 16 hours or more of ball mill grinding. The grinding process imparts high levels of contaminants into the resulting glass frit mixture. More specifically, in ball mill grinding processes that use, for example, alumina balls and an alumina jar, the grinding process causes alumina pick up. That is, the alumina balls wear away, imparting impurities into the glass frit mixture. The impurities degrade the sealing glass quality and make the glass frit mixture susceptible to crystallization during the heating process. This crystallization degrades the quality of the resulting seal. In addition, the alumina contamination causes a rise in the glass transition temperature of the glass frit mixture. The contamination also introduces uncertainty into the manufacturing process since the amount of contamination varies from lot to lot. In addition, the grinding process is expensive due to the time involved and the need to purchase and dispose of alumina balls.

Once the glass frit and binder mixture is blended, tape casting methods are used to form thin tape-cast sheets of glass frit mixture. Once a sufficient number of layers of tape-cast sheets are laminated together to form an assembly having the proper height, the assembly is placed in an oven and is heated (typically at about 350–400 degrees Centigrade). This heating process removes the organic compounds in the binder layer. In addition, the heating process sinters the glass frit mixture. The heating process typically only removes some of the organic compounds, resulting in residual impurities. Typically, residual impurities range from 170–220 parts per million (ppm). The resulting glass frit bar is lapped or ground to the desired thickness. In one prior art process, a thickness of about 50 thousandths of an inch (mils) is obtained. Next, the block is cut into glass frit bars having the desired dimensions. In one prior art process, glass frit bars having a width of 137 mils are obtained in lengths adapted to conform to the size of the flat panel display being manufactured.

The glass frit fabrication process is time consuming and expensive due to the numerous fabrication steps. In addition, the residual impurities outgas during the sealing process. Also, the residual impurities increase the melting temperature of the glass frit bars, thus requiring a higher temperature sealing process. These high temperatures required during the sealing process damage the emitters so as to degrade the cathode. Also, the high temperatures induce stress in the surfaces of the faceplate and the backplate. Moreover, the high temperatures cause the surfaces of the flat panel display to outgas. The outgassed contaminates degrade the emitter surface causing electron emissions to be unstable and to be generally reduced. In addition, ions formed through the collision of electrons with outgassed molecules can be accelerated into the emitter tips and may degrade their emission. Plasma formed in the same manner can short emitter tips to the overlying gate and can cause arcing at high field regions in the display. Thus, outgassing interferes with the operation of the cathode, resulting in reduced picture quality.

What is needed is a flat panel display and a method for making a flat panel display that has an effective seal between the faceplate and the backplate. More particularly, a way to make a flat panel display is needed that will reduce defects in the seal. In addition, a flat panel display and a way to make a flat panel display is needed that minimizes damage to the active areas of the faceplate and the backplate. Also, a flat panel display and method for forming a flat panel display is needed that reduces manufacturing time and manufacturing costs. A glass frit bar and a method for forming a glass frit bar having low amounts of impurities is needed. In addition, a need exists for a glass frit bar and a method for forming a glass frit bar wherein the method and glass frit bar are less expensive and reduce fabrication process time. The present invention meets the above needs.

DISCLOSURE OF THE INVENTION

The present invention provides a method for forming seal material bars using an extrusion process. Also disclosed are methods for forming a thin flat panel display using seal material bars and seal material frames. In addition, seal material frames and methods for forming seal material frames that form a good hermetic seal between a faceplate and a backplate are disclosed.

In one embodiment of the present invention, a flat panel display is disclosed that includes a faceplate and a backplate that are attached using glass frit. The backplate is fabricated by forming a cathode on an active area of a glass plate. The faceplate is fabricated by depositing luminescent material within an active area formed on a glass plate.

The flat panel display of this embodiment of the present invention is fabricated by placing seal material bars on the backplate such that the seal material bars surround the active area of the backplate. A glass frit slurry is placed between adjoining seal material bars. The faceplate is then placed over the backplate such that the seal material is disposed between the faceplate and the backplate. The resulting assembly is placed in an oven and is heated in a nonreactive gas environment so as to form a seal that attaches the faceplate to the backplate. Thus, a seal is formed around the periphery of the active areas of the faceplate and the backplate. The flat panel display is then evacuated and sealed in an evacuated state. Alternatively, the seal material bars and glass frit slurry are placed over the faceplate and the backplate is placed over the faceplate so as to form an assembly that is then heated to form a flat panel display.

In this embodiment, since a single heating step is used to seal the faceplate to the backplate, outgassing is reduced. That is, since a single heating step is used, damage to the active areas is reduced, eliminating stress fracturing related defects and lessening thermal stress. Thus, the flat panel display and method for forming a flat panel display of the present invention results in fewer defects and an increased yield. Moreover, since multiple heating steps are not required, time is saved, throughput is increased, and manufacturing costs are reduced.

Alternatively, conventional multi-step heating processes are used to melt the seal material bars and seal the faceplate to the backplate. In one embodiment, a laser is used to melt the bars of seal material. In this process, the assembly is first heated to the bias temperature of the glass to relieve thermal stress. Then a laser is used to heat the seal material so as to form a seal between the faceplate and the backplate.

A method for forming a seal material bar using an extrusion process is also disclosed. The use of an extrusion process for forming a seal material bar eliminates the need for ball-mill grinding. Thus, manufacturing time is lessened and alumina contamination is eliminated. The resulting seal material bar has a lower level of organic contaminates than results from prior art processes that use tape casting methods. These factors result in lower cost seal material bars and lower cost flat panel displays.

Seal material bars are disclosed which include joining features. The joining features are used to attach adjoining seal material bars. The use of joining features gives stronger joints. In addition, defects at joints are reduced since adjoining seal material bars are less prone to move. Also, because space between adjoining joints is controlled, defects resulting from air pockets are reduced. In addition, manufacturing time and manufacturing cost are reduced since frit bars may be quickly and accurately positioned.

A seal material frame and a method for forming a seal material frame are disclosed. In addition, a method for forming a flat panel display using a seal material frame is disclosed. The use of a seal material frame forms an effective seal between the faceplate and the backplate with reduced defects over prior art methods for forming flat panel displays. In addition, manufacturing time and manufacturing cost are reduced.

In one embodiment, a method for forming a seal material frame using a single seal material bar is disclosed. The use of a single seal material bar to form a frit frame provides a seal material frame with only a single joint. Since there is only one joint, defects are reduced. In one embodiment, the joint is not located at a corner. This provides a better seal at corners since there is no joint that may cause a defect.

The use of ceramic materials is also disclosed. Ceramic may be extruded so as to form bars that are used in the same way as glass frit bars to form a flat panel display.

In one embodiment, sealing material bars are joined together to make a sealing material frame using clamps that hold and heat each joint individually.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
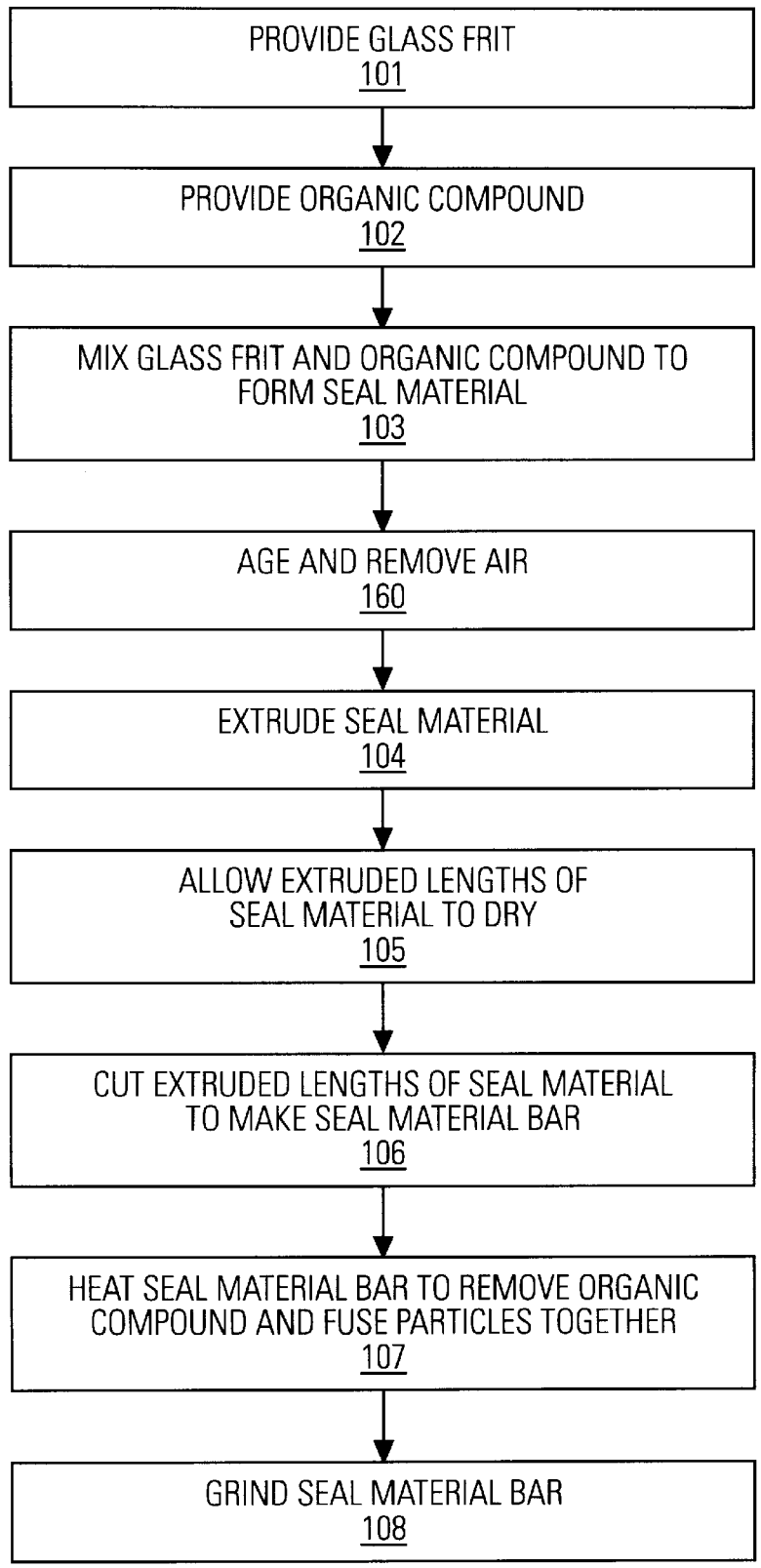
FIG. 1a is a diagram illustrating steps associated with the formation of a sealing material bar in accordance with the present claimed invention.

FIG. 1a shows the steps for forming a seal material bar. First, glass frit is provided as shown by step 101.

Organic compound is also provided as shown by step 102. In one embodiment, QPac is used as an organic compound. QPac organic compound may be purchased from Pac Polymer of Delaware.

Next, the glass frit and the organic compound are mixed together as shown by step 103. In one embodiment, a mixture of 96–98 percent glass frit and 2 to 5 percent organic compound is used. Any of a number of different methods may be used for mixing the glass frit and the organic compound. In one embodiment, an industrial mixer is used that kneads the glass frit and the organic compound together.

In one embodiment, the resulting mixture is aged and air is removed from the mixture as shown by step 160. Typically, an air removal mechanism in the extrusion device is used for removing air.

The resulting mixture is then extruded as shown by step 104 to form extruded lengths of seal material. In one embodiment, the mixture of seal material is forced through a rectangular aperture at high pressure to form extruded lengths of seal material having a rectangular cross section.

Continuing with FIG. 1*a*, the extruded lengths of seal material are then allowed to dry as shown by step 105.

As shown by step 106, the extruded lengths of seal material are then cut to the required lengths so as to form seal material bars.

The seal material bars are then heated to remove the organic compound as shown by step 107. The heating step also sinters the seal material, fusing the particles together.

The seal material bars are then ground to the required thickness as shown by step 108. The fabrication process of the present invention results in seal material bars having impurity levels of less than or equal to 50 parts per million of residual organic compounds. Thus, the seal material bars of the present invention have a much lower level of impurities than bars manufactured using prior art processes.

Figure 1B:
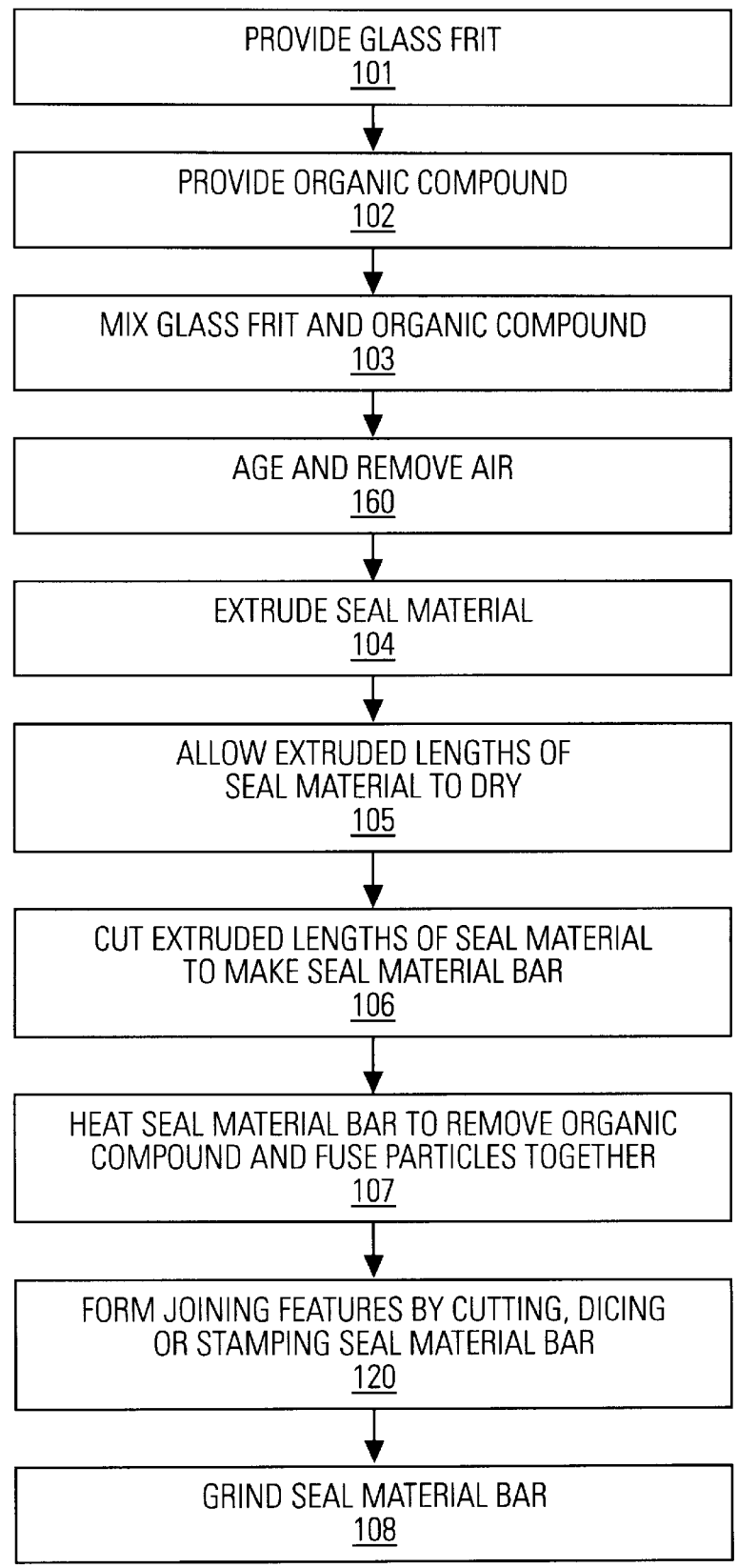
FIG. 1b is a diagram illustrating steps associated with the formation of a sealing material bar that includes joining features in accordance with the present claimed invention.

Referring now to FIG. 1*b* a method for forming a frit bar that has joining features is shown. In this embodiment, glass frit and organic compound are provided, mixed, aged and air is removed as shown by steps 101–103, and 160. The resulting mixture is then extruded and dried as shown by steps 104–105 in the same manner as discussed in FIG. 1*a*. The extruded lengths of seal material are then cut to the desired length as shown by step 106 to form seal material bars. In one embodiment, the seal material bars have a rectangular cross section.

Continuing with FIG. 1*b*, the seal material bar is then heated so as to remove the organic compound and fuse the particles together as shown by step 107. Joining features are then formed in each frit bar as shown by step 120. Joining features are formed by cutting, dicing or stamping the seal material bars formed in steps 101–106. Alternatively, a single cutting, dicing, or stamping step may be used to both cut each seal material bar to the required length and to form the required joining features. That is, in an alternate embodiment, steps 106 and 120 are combined into a single step of stamping, dicing or cutting the extruded lengths of seal material so as to form a seal material bar having joining features.

The resulting seal material bar is ground to the required thickness as shown by step 108. In one embodiment, seal material bars having elongated bodies with a rectangular cross section are formed.

In an alternate embodiment, seal material bars are formed using ceramic material. In this embodiment, the ceramic material is extruded in the same manner as the glass frit mixture to form bars of ceramic material.

Figure 1C:
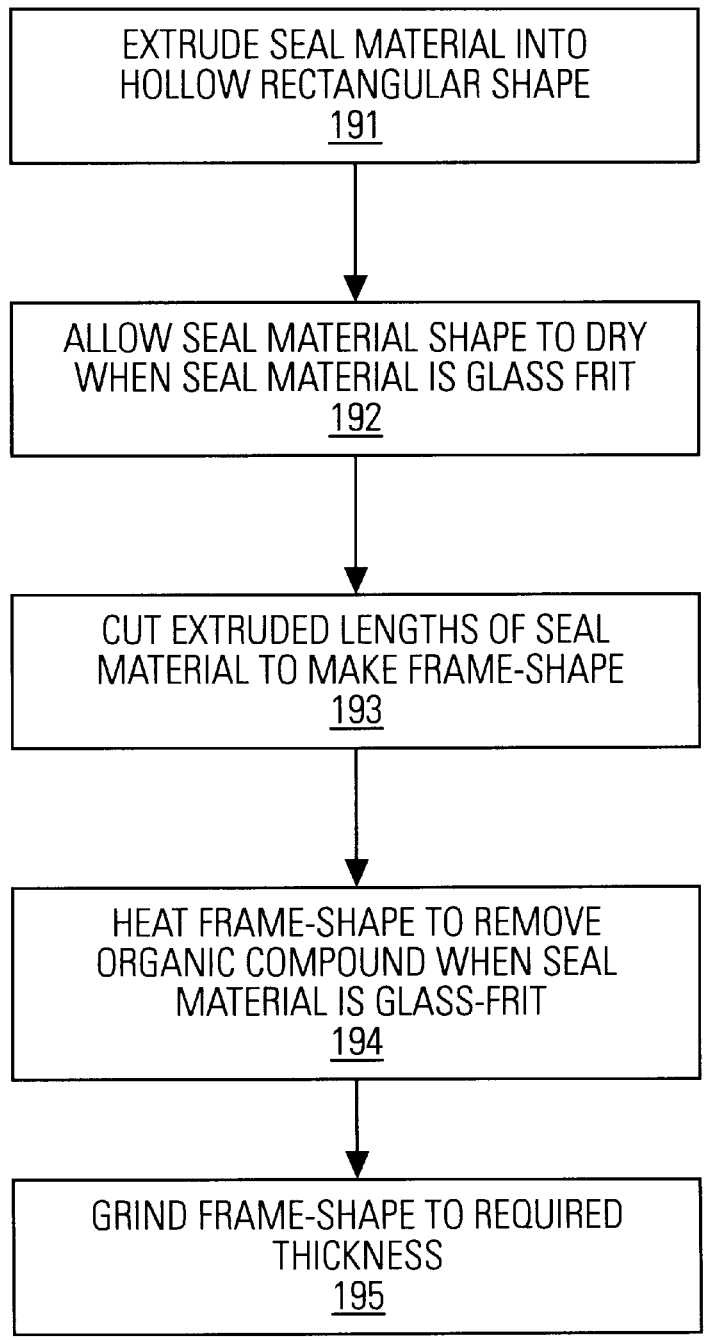
FIG. 1c is a diagram illustrating steps associated with the formation of a seal material frame in accordance with the present claimed invention.
Figure 1D:
FIG. 1d is a top view of a seal material frame formed according to the steps of FIG. 1c in accordance with the present claimed invention.

In yet another embodiment, the seal material is extruded so as to form a frame-shape. FIG. 1*c* shows a method for forming a frame using extruded seal material. First, as shown by step 191, seal material is extruded into a hollow rectangular shape. FIG. 1*d* shows an extruded length of seal material 190 that is extruded into a hollow rectangular shape. In one embodiment, the seal material is ceramic. In an alternate embodiment, the seal material is glass flit. In one embodiment, the seal material is seal material formed according to steps 101–104, and 160, of FIG. 1*a*. When the seal material is glass frit, the extruded lengths of seal material are allowed to dry as is shown by step 192. The extruded shape is then cut as shown by step 193. Once the extruded seal material is cut, a frame-shape is obtained. When glass frit is used as a seal material, the resulting frame-shape heated as is shown by step 194, and is ground to the required size as shown by step 195 to form a completed seal material frame. This embodiment is well adapted to make seal material frames of various sizes by altering the size and shape of the extrusion.

Figure 7:
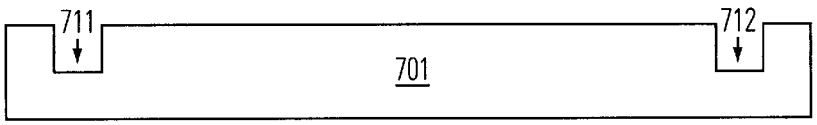
FIG. 7 is a top view of seal material bars having joining features that are pegs and slots in accordance with the present claimed invention.
Figure 7:
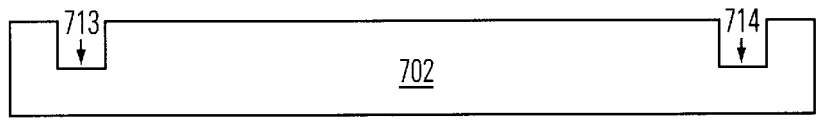
Figure 7:
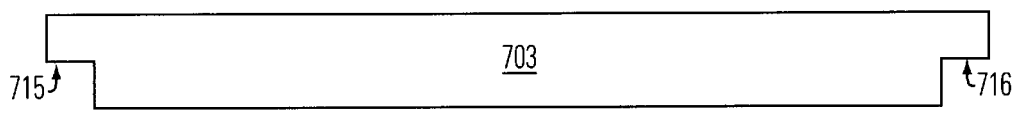
Figure 7:
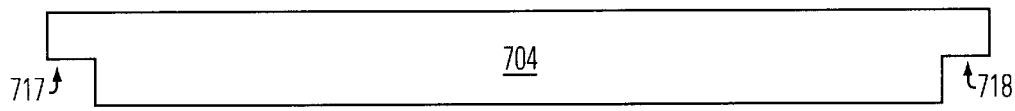

In one embodiment, the joining features formed by step 120 of FIG. 1*b* are pegs such as pegs 715–718 of FIG. 7 and corresponding slots such as slots 711–714 of FIG. 7. Alternatively, the joining features that are formed are angled pegs such as angled pegs 912, 914, 916, and 918 of FIG. 9 and angled slots such as angled slots 911, 913, 915, and 917 of FIG. 9. In yet another embodiment, the joining features are re-entrant angled pegs such as pegs 1115–1118 of FIG. 11 and corresponding re-entrant angled slots such as re-entrant angled slots 1111–1114 of FIG. 11. In still another embodiment, the joining features are pegs such as pegs 1313–1316 of FIG. 13.

Figure 13:
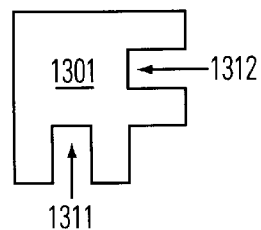
FIG. 13 is a top view of seal material bars and a seal material corner piece that have joining features that are pegs and slots in accordance with the present claimed invention.
Figure 13:
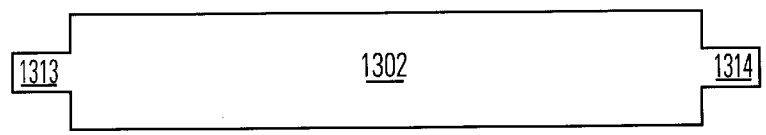
Figure 13:
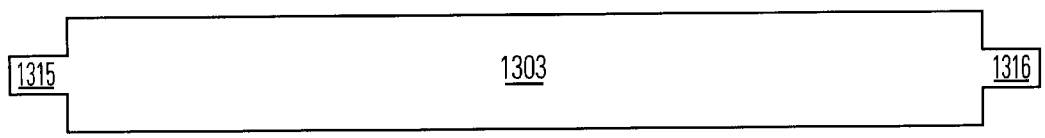

The method shown in FIG. 1*b* may also be used to form seal material corner pieces such as seal material corner piece 1301 of FIG. 13 by the extrusion of a length of glass frit and organic compound having sufficient width to form corner piece 1301. Alternatively, ceramic material or a glass frit bar formed using a lamination process may be used. The corner piece is stamped or cut in the same manner as previously discussed in step 120 to form the required shape. In an alternate embodiment (not shown), the joining features on the seal material corner piece are angled slots and angled pegs. In another embodiment (not shown), re-entrant angled slots and re-entrant angled pegs are formed.

Continuing with FIGS. 1*a* and 1*b*, because the seal material bars of the present invention are formed using an extrusion process, there is no need to perform a grinding step. Thus, alumina balls are not required as is required in prior art fabrication processes. This results in higher purity seal material bars since there is no alumina contamination. In addition, since there is no lamination required, there is less binder, resulting in a much lower contaminate count. In addition, less organic material is required than is required in prior art processes, resulting in lower impurities. In addition, since the heating step is performed on thin lengths of extruded material, more surface area is exposed in the heating process. This increases the effectiveness of the heating process for removing impurities. Also, the grinding process is much faster than prior art grinding processes since it is easier to grind the thin lengths of extruded material than it is to grind large blocks of material as is done in prior art processes. In addition, the extrusion process is much faster than prior art methods for forming glass frit bars since the numerous steps of tape casting and lamination are eliminated. Typically, extrusion rates from 4 to 10 feet of bar per minute are obtained.

Figure 2:
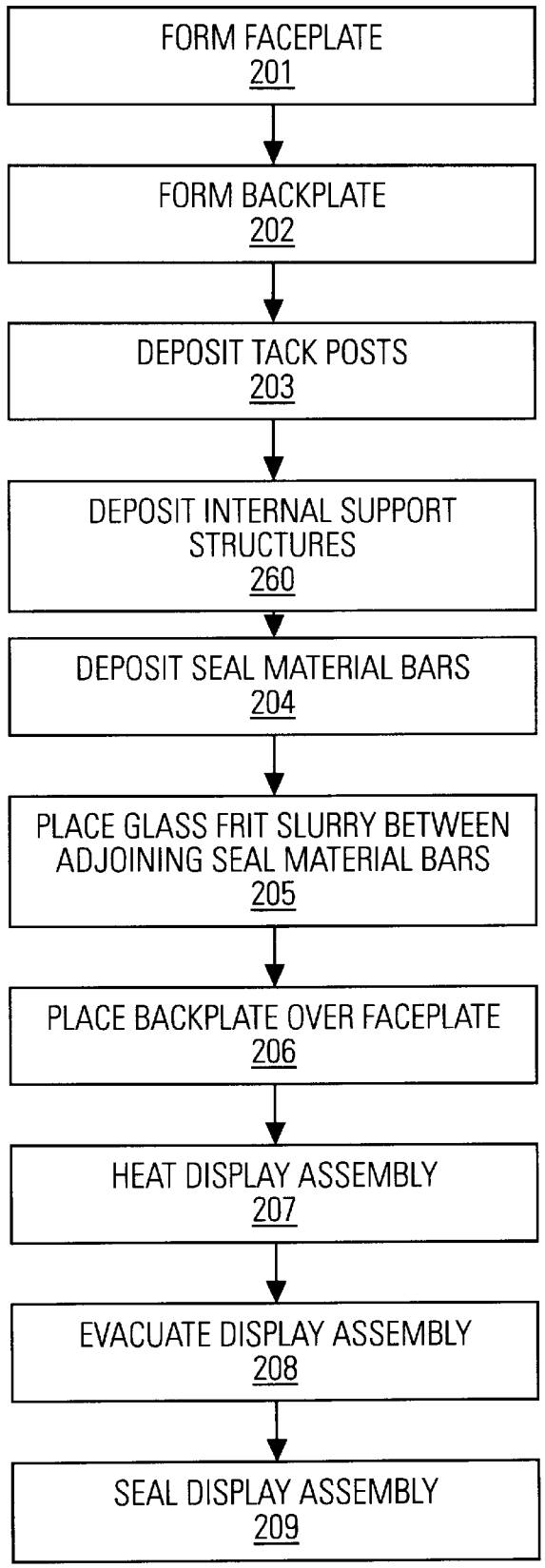
FIG. 2 is a diagram illustrating steps associated with the formation of a thin flat panel display in accordance with the present claimed invention.
Figure 3A:
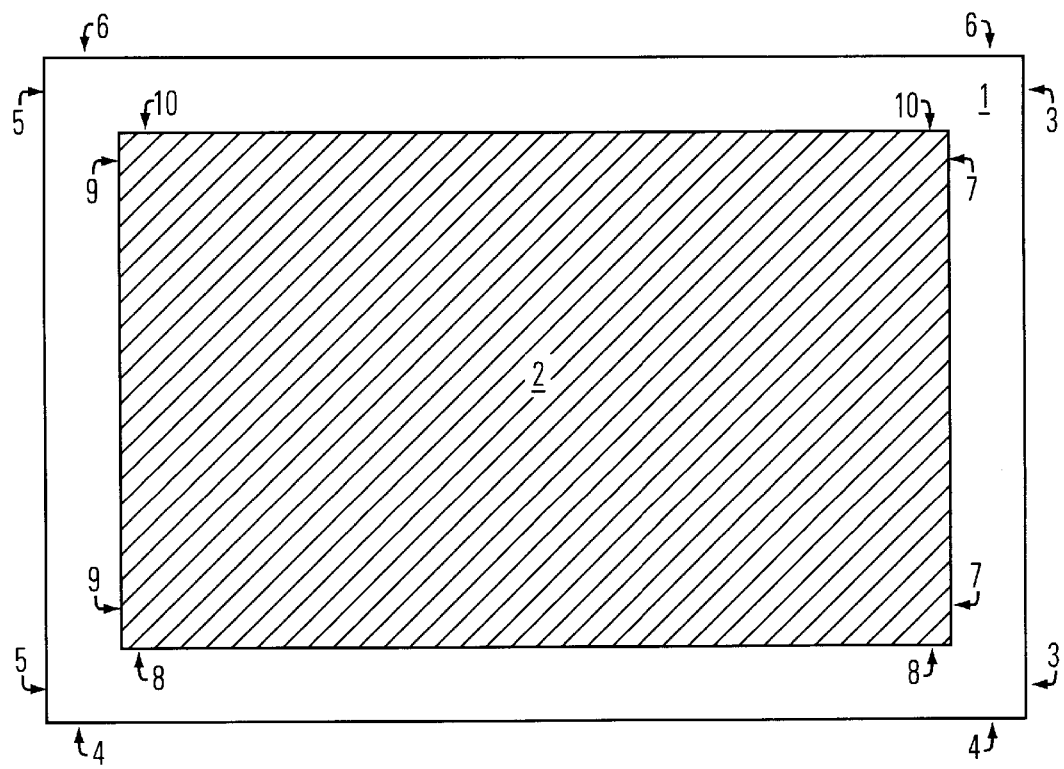
FIG. 3a is a top view illustrating a faceplate in accordance with the present claimed invention.
Figure 3B:
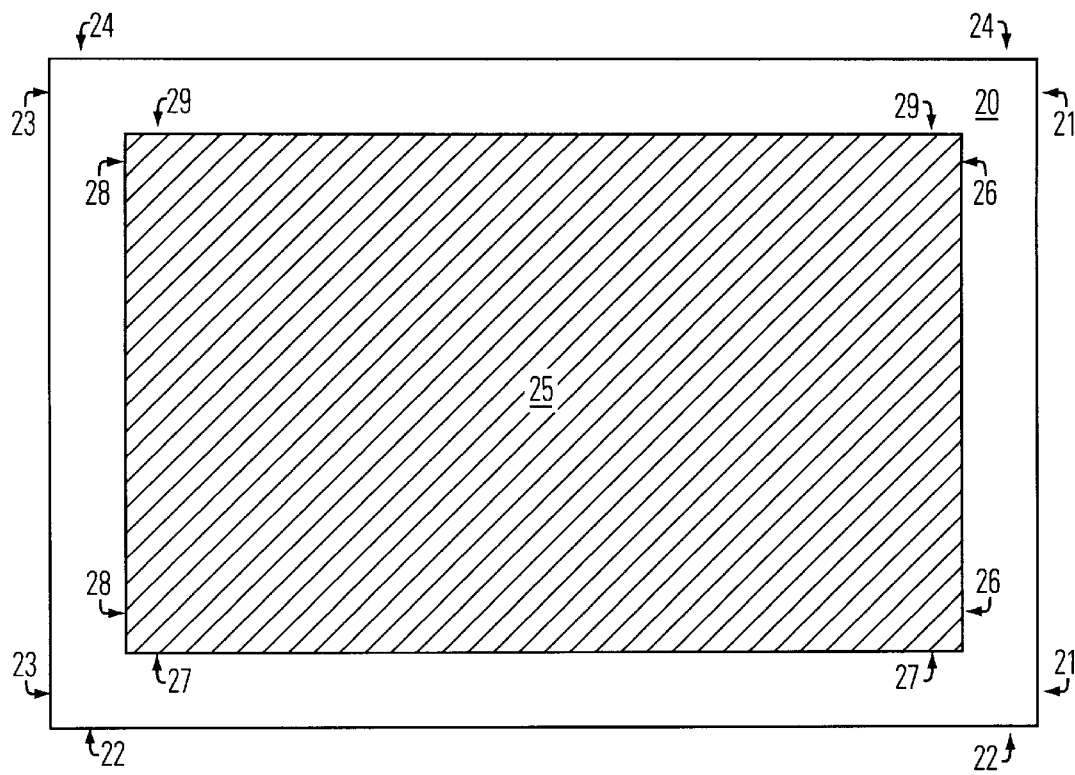
FIG. 3b is a top view illustrating a backplate in accordance with the present claimed invention.

Referring now to FIG. 2, the steps for forming a display in accordance with one embodiment of the present invention are shown. First, as shown by step 201, a faceplate that includes an active area is formed. In one embodiment of the present invention, a faceplate is formed by depositing phosphor onto a glass plate. FIG. 3*b* shows a faceplate 20 having side surfaces 21–24. Phosphor, not shown, is deposited so as to form active area 25. Active area 25 does not cover the entire surface area of faceplate 20. That is, side surfaces 21–24 of active area 25 are separated from side surfaces 21–24 of faceplate 20.

Continuing with FIG. 2, as shown by step 202, a backplate is formed. In the embodiment shown in FIG. 3a, backplate 1 is shown to include side surfaces 3–6 and active area 2. Active area 2 is bounded by side surfaces 7–10. In one embodiment of the present invention, backplate 1 is a glass plate onto which successive layers of material have been deposited so as to form cathodic structures within active area 2. These cathodic structures include emitters that emit electrons.

Referring still to FIG. 2, tack posts are then deposited onto the faceplate as shown by step 203. In the embodiment shown in FIG. 3c, tack posts 34 are attached to faceplate 20 near each corner of faceplate 20. However, the number and location of tack posts may be altered, as necessary, to accommodate the size and shape of the display to be formed.

In one embodiment, as shown by step 260 internal support structures are deposited on the faceplate. These internal support structures are typically spacer walls that maintain the proper spacing between the faceplate and the backplate.

Referring again to FIG. 2, seal material bars are deposited around the active area of the faceplate as shown by step 204. In the embodiment shown in FIG. 3c, seal material bars 30–33 are deposited outside of active area 25 between side surfaces 26–29 shown in FIG. 3b and side surfaces 21–24 that are shown in FIG. 3b. In one embodiment, glass frit slurry 35 is disposed at each joint as shown by step 205. In one embodiment, glass frit slurry is a mixture of glass frit and organic compound which is identical to the mixture of glass frit and organic compound obtained by performing steps 101–103 of FIG. 1a. That is, in one embodiment, the glass frit slurry is a mixture of approximately 96–98 percent glass frit and 2 to 4 percent organic compound.

The backplate is then placed over the faceplate as shown by step 206 of FIG. 2. The placement of the backplate over the faceplate is performed so as to align active area 2 of FIG. 3a with active area 25 of FIGS. 3b–3c. FIG. 3d shows backplate 1 placed over faceplate 20 such that seal material bars 30–33 are disposed between faceplate 20 and backplate 1, forming display assembly 60. Tack posts 34 maintain the desired spacing between backplate 1 and faceplate 20.

As shown by step 207 of FIG. 2, display assembly 60 is heated. In one embodiment, display assembly 60 is placed into an oven that is at a temperature of 350 degrees Centigrade for half of an hour. Alternatively, other heating methods may be used such as, for example, microwave heating.

Figure 3C:
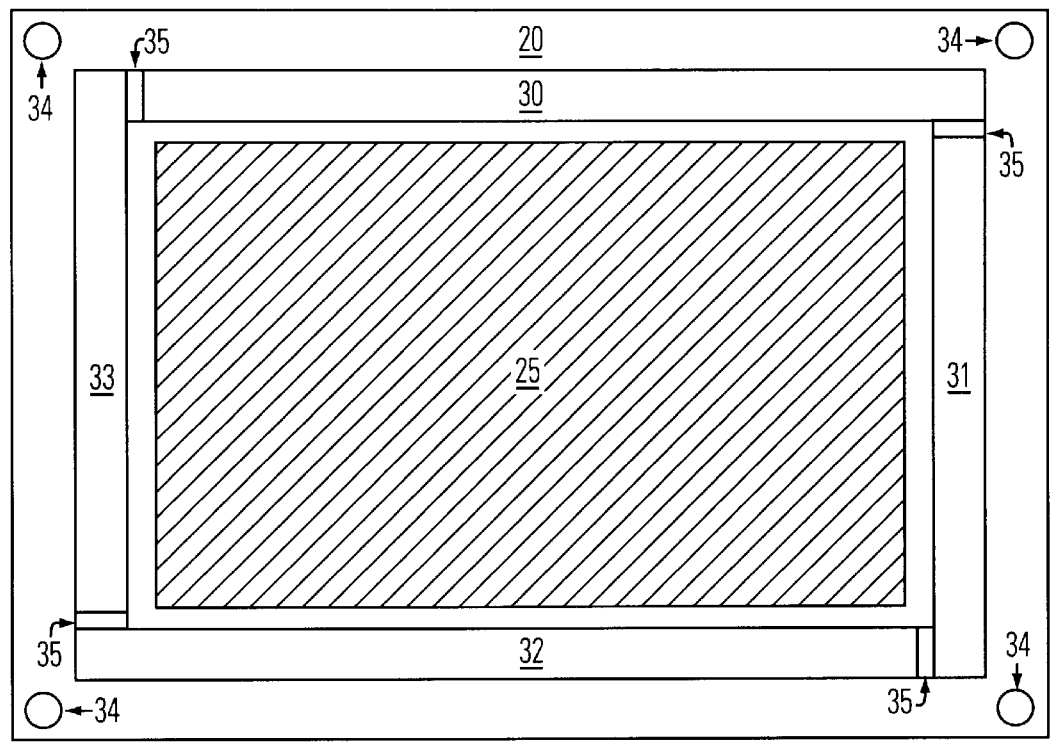
FIG. 3c is a top view illustrating a backplate having seal material bars and glass frit slurry deposited thereon in accordance with the present claimed invention.
Figure 3D:
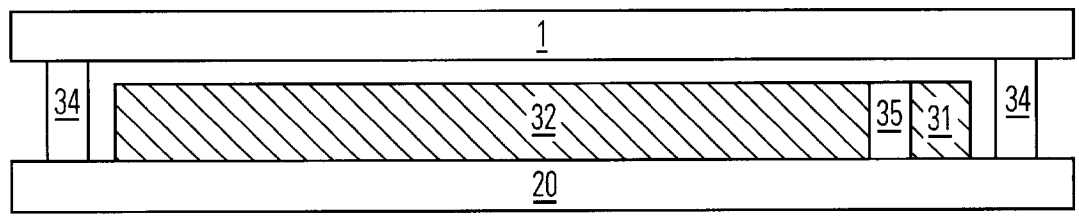
FIG. 3d is a side view illustrating a flat panel display assembly after the completion of steps 201–206 of FIG. 2 in accordance with the present claimed invention.

Referring now to FIG. 3c, glass frit slurry 35 that lies between seal material bar 30 and seal material bar 31 will join seal material bars 30 and 31 together. Glass frit slurry 35 that lies between seal material bar 31 and seal material bar 32 will join seal material bars 31 and 32. Similarly, glass frit slurry 35 that is between seal material bars 32 and 33 will join seal material bars 32 and 33 and glass frit slurry 35 that is between seal material bars 33 and 30 will join seal material bars 33 and 30. This holds the seal material bars 30–33 together and prevents moving during the rest of the heating process.

Alternatively, lasers are used to perform the required heating. When lasers are used, the display assembly is heated in a pre-heating step prior to the laser heating step in order to minimize stress fracturing. In one embodiment this heating process heats the display assembly to the bias temperature of the glass. In one embodiment, heating is performed in an inert gas environment (e.g. Nitrogen) to minimize oxidation. During the pre-heating step, glass frit slurry 35 melts, so as to bond adjoining seal material bars. Since the seal material bars are attached together, they do not move during the laser heating process.

Figure 3E:
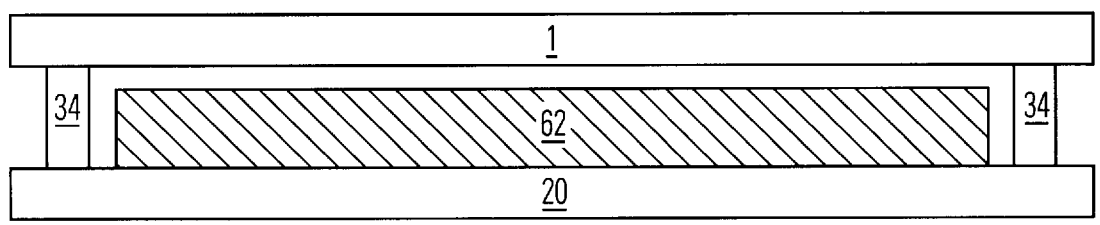
FIG. 3e is a side view illustrating a completed flat panel display assembly in accordance with the present claimed invention.

Continuing with FIG. 2, the glass frit expands as it melts and wets the surfaces of both the faceplate and the backplate. The display assembly is then removed from the oven and is allowed to cool so as to produce an airtight seal. In one embodiment of the present invention, the glass frit has a thickness of approximately 48–52 mils prior to heating, giving a thickness of 52 mils after completion of the heating step. The melting of the seal material forms a seal that extends between the bottom surface of faceplate 1 to the top surface of backplate 2. FIG. 3e shows the assembly of FIG. 3d after the heating step is complete, forming flat panel display 70 that includes seal 62. Seal 62 forms a hermetic seal between faceplate 1 and backplate 20 that encloses active area 2 of FIG. 3a and active area 25 of FIGS. 3b–3c.

Continuing with FIG. 2, the display assembly is evacuated as shown by step 208 and is sealed as is shown by step 209. Referring to FIG. 3a–3e the sealing process forms a hermetically sealed enclosure between faceplate 1 and backplate 2 that encloses active area 2 and active area 25.

Other process steps could also be performed as required. In one embodiment, a low temperature curing step is used to accelerate outgassing at a low temperature. In this embodiment, a getter is used to absorb the outgassed species. The getter is typically an evaporated metal such as barium, or a non-evaporable getter such as is sold by SAES Getter, S.p.A.

In an alternate embodiment, evacuation is accomplished by sealing the faceplate to the backplate in a vacuum.

Figure 4A:
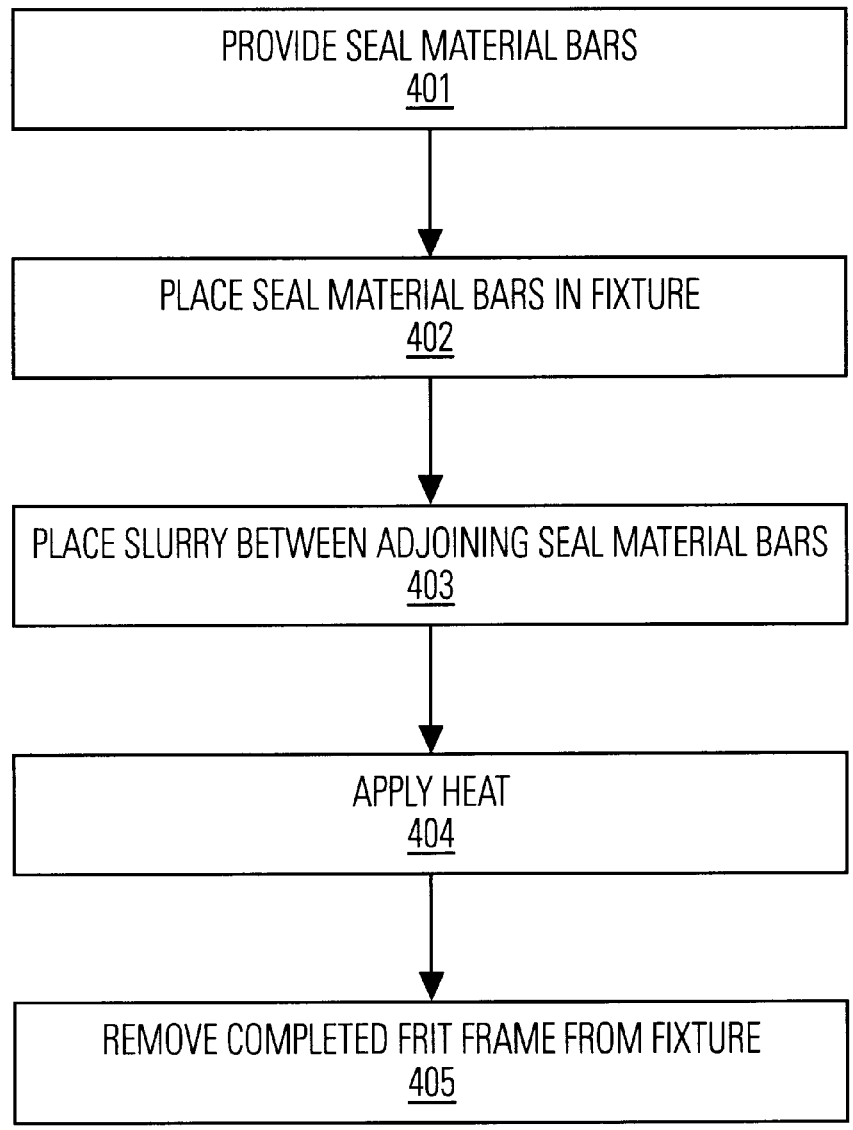
FIG. 4a is a diagram illustrating steps associated with the formation of a seal material frame using seal material bars and slurry in accordance with the present claimed invention.

In an alternate embodiment that is shown in FIG. 4a, seal material bars are joined into a one-piece seal material frame prior to placement of the seal material bars onto the backplate. First, seal material bars are provided as shown by step 401. In one embodiment, the seal material bars that are used are formed according to method shown in FIG. 1a. The seal material bars are placed onto a fixture as shown by step 402. In one embodiment, a fixture that precisely aligns the seal material bars into a frame-shape is used. Alternatively, any flat surface may be used instead of a fixture when less precise alignment is required.

Figure 4B:
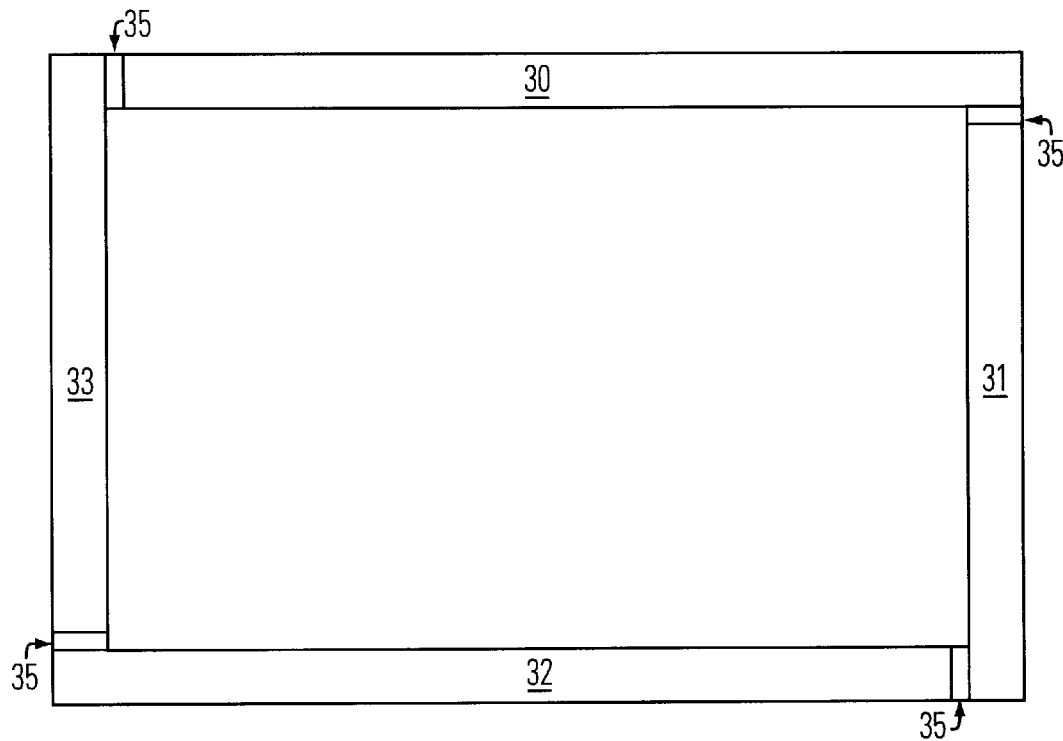
FIG. 4b is a top view of a frame-shape formed by steps 401–403 of FIG. 4a in accordance with the present claimed invention.

Continuing with FIG. 4a, glass frit slurry is placed between adjoining seal material bars as shown by step 403. Referring now to FIG. 4b, the configuration formed by placing glass frit slurry 35 between seal material bars 30–33 is shown. Glass frit slurry 35 is disposed between seal material bar 30 and seal material bar 31, between seal material bar 31 and seal material bar 32, between seal material bars 32 and 33, and between seal material bars 33 and 30.

Figure 14:
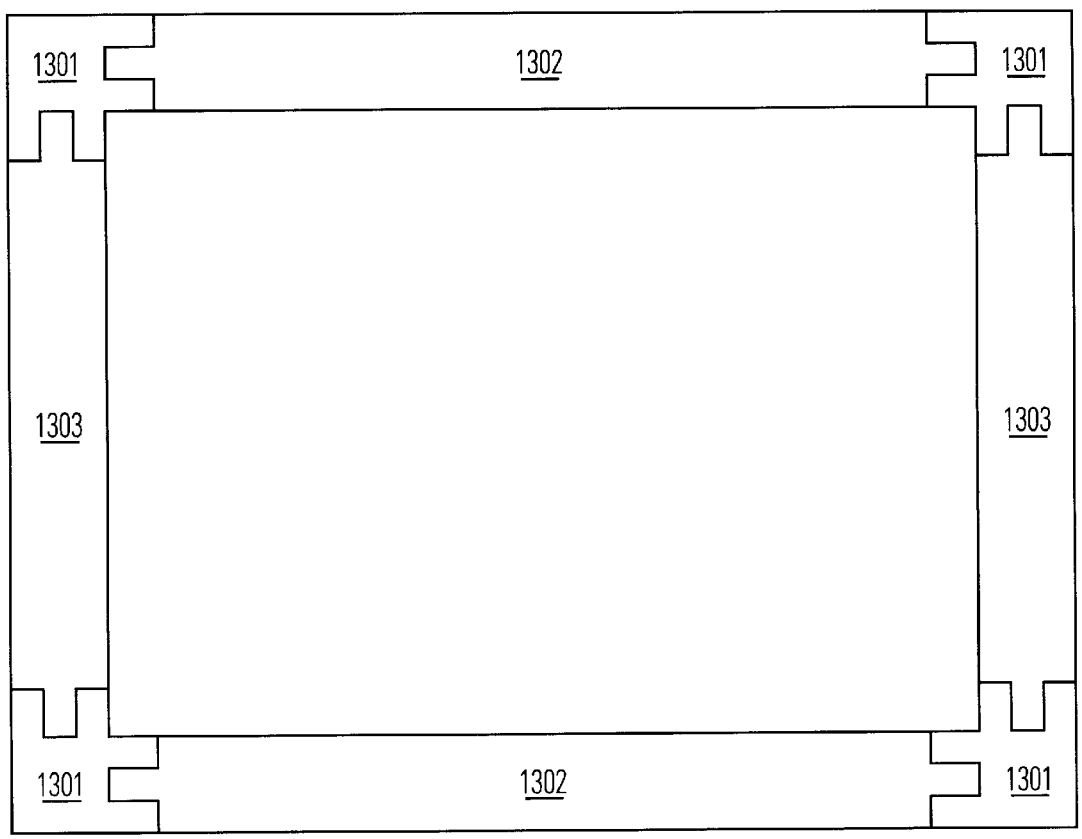
FIG. 14 is top view of a seal material frame formed using seal material bars and a seal material corner piece that have joining features that are pegs and slots in accordance with the present claimed invention.

Alternatively, the seal material bars shown in FIGS. 7–12 and the seal material bars and corner piece shown in FIGS. 13–14 may be used in the same manner as seal material bars 30–33 of FIG. 3c to form a flat panel display. That is, referring now to FIG. 2, in step 204, seal material bars having joining features are deposited over the backplate. By mating the joining features of adjoining seal material bars, the seal material bars are held in place. Thus, there is no need to place glass frit slurry between seal material bars as is shown by step 205. However, when joining features that do not fit tightly together are used, it may be desirable to use glass frit slurry within the joint to assure a proper joint.

Referring back to FIG. 4a, heat is applied as shown by step 404 so as to fuse the seal material bars together, forming a seal material frame. In one embodiment, a temperature of 370 degrees Centigrade is applied so as to bond adjoining seal material bars into a seal material frame. The completed seal material frame is then removed from the fixture as is shown by step 405.

Figure 5:
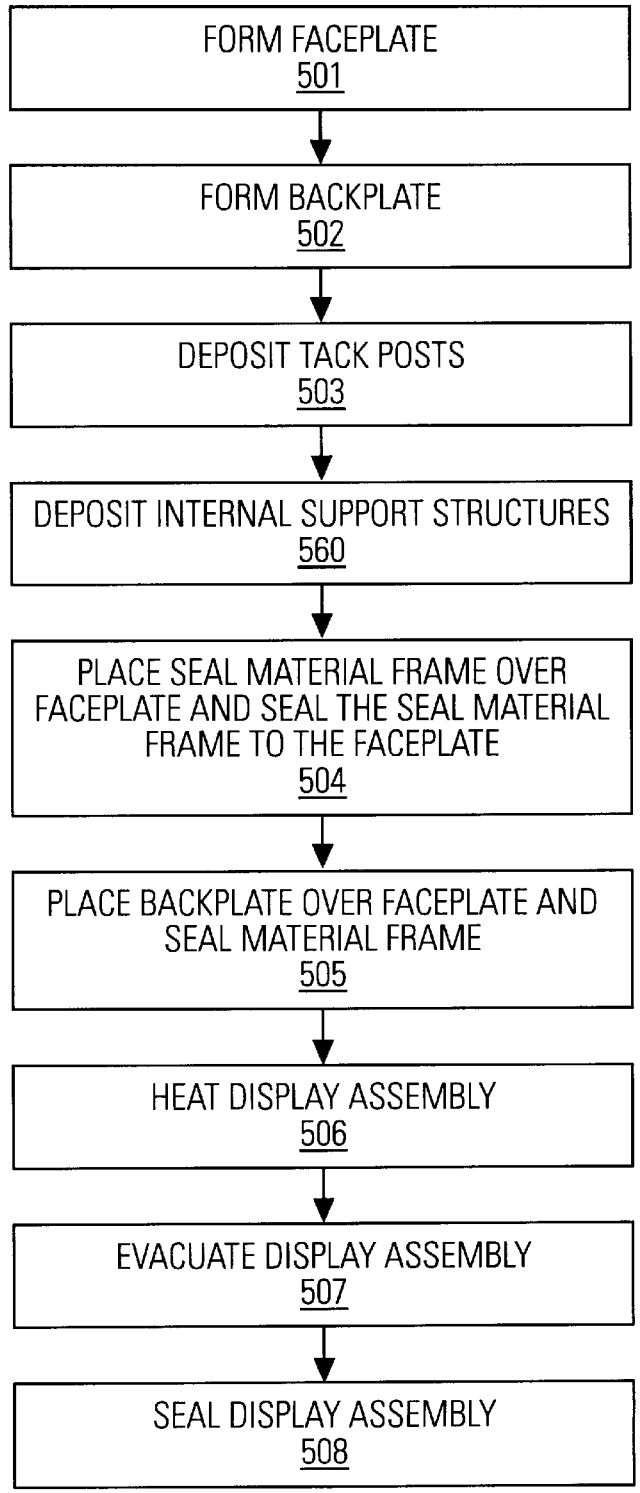
FIG. 5 is a diagram illustrating steps associated with the formation of a thin flat panel display using a preformed seal material frame in accordance with the present claimed invention.

FIG. 5 shows a method for forming a flat panel display using a seal material frame. A faceplate and a backplate are formed as shown by steps 501–502 and tack posts are deposited as shown by step 503. Internal supports such as, for example spacer walls are then deposited as shown by step 560. Then, the seal material frame is placed over the faceplate as shown by step 504. The seal material frame is placed over the faceplate such that it surrounds the active area of the faceplate. Referring still to step 504, the seal material frame is sealed to the faceplate. Typically a heating process is used to seal the seal material frame to the faceplate. The backplate is then placed over the faceplate and the seal material frame as shown by step 505 and the resulting display assembly is heated as shown by step 506. In one embodiment, the heating step is performed in an oven that is at a temperature of 370 degrees Centigrade. Alternatively, a laser heating process is used.

Alternatively, lasers are used to perform the required heating. When lasers are used, the display assembly is heated in a pre-heating step prior to the laser heating step in order to minimize stress fracturing. In one embodiment the pre-heating step heats the display assembly to the bias temperature. In one embodiment, the laser-heating process is performed in an inert gas environment (e.g. Nitrogen) to minimize oxidation. Since the seal material bars are attached together into a seal material frame, they do not move during the laser heating process. The process is completed by evacuating the display assembly and sealing the display assembly as shown by steps 507–508 so as to obtain a hermetically sealed enclosure that encloses the active area of the faceplate and the active area of the backplate.

Continuing with FIG. 5, since a seal material frame is used instead of bars of seal material, there is no need to precisely place each bar of seal material as is required in prior art processes. In addition, since the seal material frame is a single piece, there is little if any movement of the seal material frame during the heating process. This prevents the problems associated with the movement of glass frit bars of prior art methods for forming a flat panel display. The use of a seal material frame that is preformed results in an assembly process that is less complicated and which is less prone to error than prior art processes. Since the formation of the seal material frame is prior to the sealing process itself, the seal material frame may be inspected and tested to make sure that no defects are present. This further assures that a hermetic seal will be obtained and decreases the likelihood of defects due to air bubbles and air spaces.

Though the formation of the display assembly of the present invention is described with reference to the placement of the backplate over the faceplate, the present invention could be assembled starting with the backplate. In such an embodiment of the present invention, the tack posts and the seal material frame are placed over the backplate and the faceplate is placed over the backplate.

Figure 6:
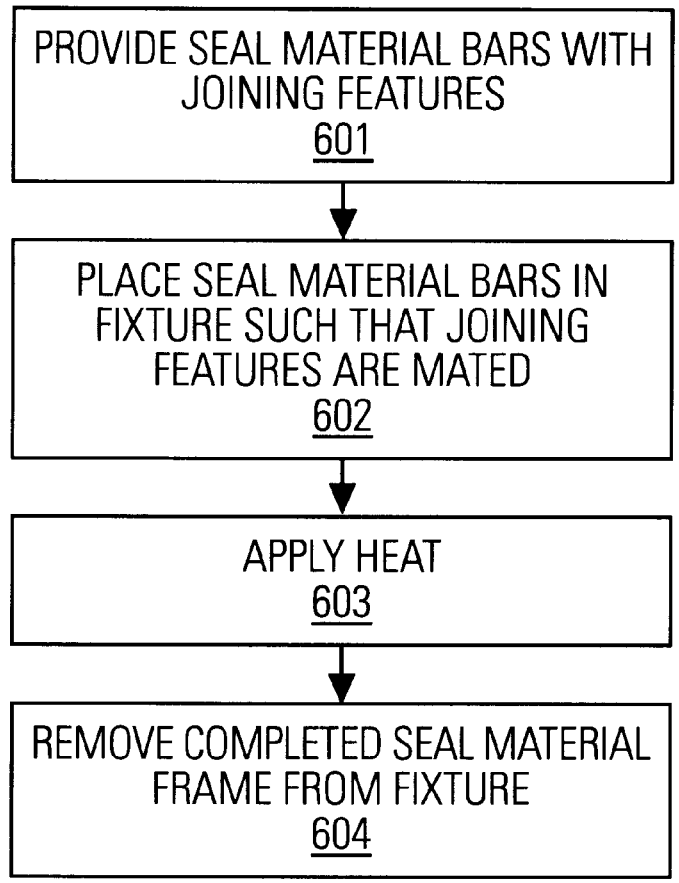
FIG. 6 is a diagram illustrating steps associated with the formation of a seal material frame using seal material bars that include joining features in accordance with the present claimed invention.
Figure 8:
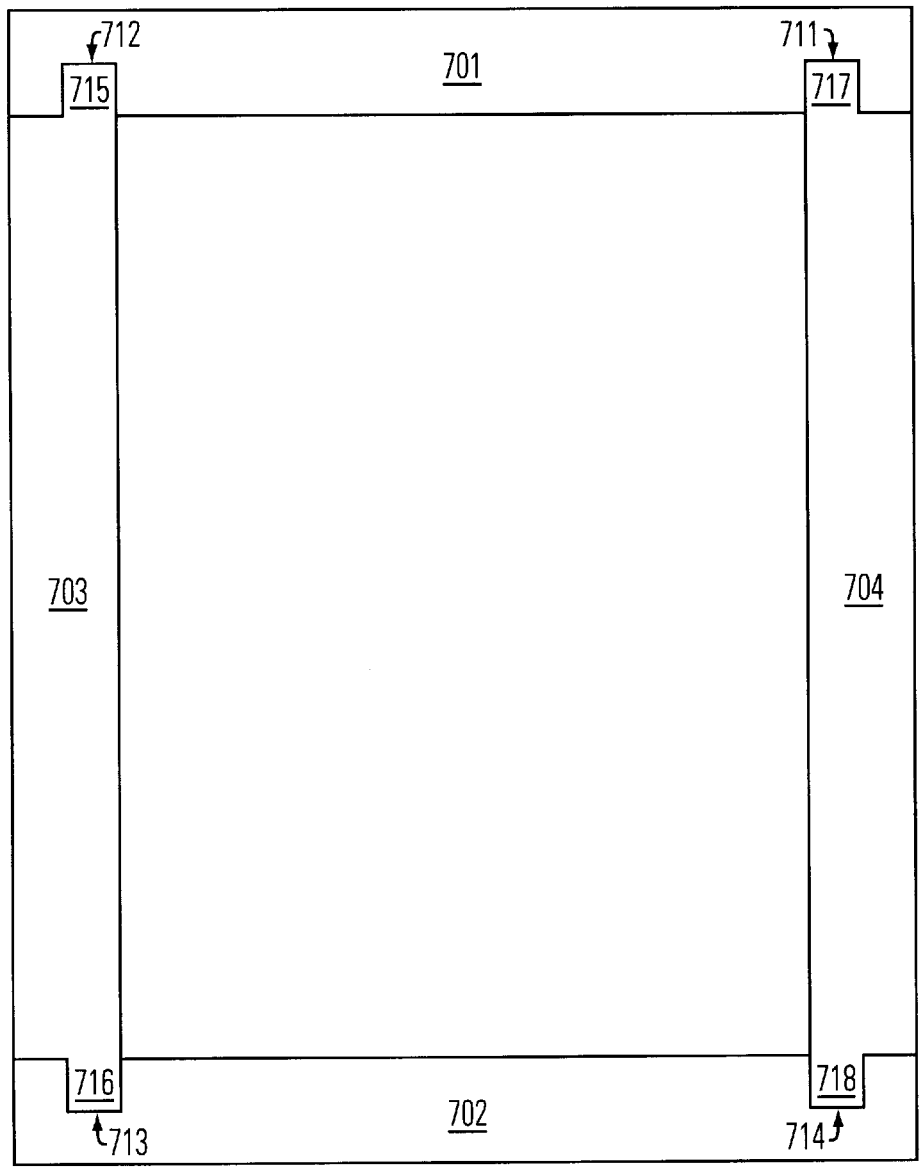
FIG. 8 is top view of a seal material frame formed using seal material bars having joining features that are pegs and slots in accordance with the present claimed invention.

FIG. 6 shows a method for forming a seal material frame using seal material bars that have joining features formed in them. As shown by step 601, seal material bars that have joining features formed in them are provided. Examples of seal material bars that include joining features are shown in FIGS. 7, 9, 11, and 13. Continuing with FIG. 6, the seal material bars are placed in a fixture such that the joining features are mated as shown by step 602. That is, the joining features on adjoining seal material bars are mated. FIGS. 8, 10, and 12 show examples of seal material bars that are mated together to form various types of seal material frames. As shown by step 603, heat is applied so as to bond adjoining seal material frames. In one embodiment, heat is applied by placing the fixture into an oven heated to approximately 400 degrees Centigrade. This heating step also functions to sinter the glass frit when glass frit is used as a seal material. The completed seal material frame is then removed from the fixture as shown by step 604.

Though the method for forming a seal material frame of FIGS. 4a and 6 is described with reference to the use of a fixture. However, alternatively, a flat surface is used instead of a fixture. However, a higher defect rate may result when a fixture is not used because alignment is not as precise as the alignment obtained using a fixture.

Referring back to FIG. 5, the preformed seal material frame is used in the fabrication process by placing the preformed seal material frame over the faceplate, placing the backplate over the faceplate, and heating the resulting assembly as shown in steps 501–506 of FIG. 5. The display assembly is then evacuated and sealed to form a completed display assembly as shown by steps 507–508.

Referring now to FIG. 7, seal material bars 701–704 are shown to include joining features on or near each end of each seal material bar. That is, seal material bars 701 and 702 are shown to include a joining feature near each end that is a female joint. More particularly, seal material bar 701 is shown to include female joint 711 near one end and female joint 712 near the opposite end. Similarly, seal material bar 702 is shown to include female joint 713 near one end and female joint 714 near the opposite end.

Continuing with FIG. 7, seal material bars 703 and 704 are shown to include a joining feature on each end that is a male joint. More particularly, seal material bar 703 is shown to include male joint 715 on one end and male joint 716 on the opposite end. Similarly, seal material bar 704 is shown to include male joint 717 on one end and male joint 718 on the opposite end. In the embodiment shown in FIG. 7, male joints 715–718 are pegs and female joints 711–714 are slots which are adapted to be mated together.

With reference now to FIG. 8, seal material bars 701–704 of FIG. 7 are shown to be attached together so as to form seal material frame 801. The seal material bars are placed together such that each of male joints 715–718 is inserted into ones of female joints 711–714. In the embodiment shown in FIG. 8, one end of seal material bar 703 is shown to be attached to seal material bar 701 and the other end is shown to be attached to seal material bar 702 (male joint 715 and female joint 712 are connected together). Similarly, one end of seal material bar 702 is attached to seal material bar 703 (male joint 716 and female joint 713 are connected together) and one end of seal material bar 704 is attached to seal material bar 701 (male joint 717 and female joint 711 are connected). The other end of seal material bar 702 is attached to seal material bar 704 (male joint 718 and female joint 714 are connected).

Figure 9:
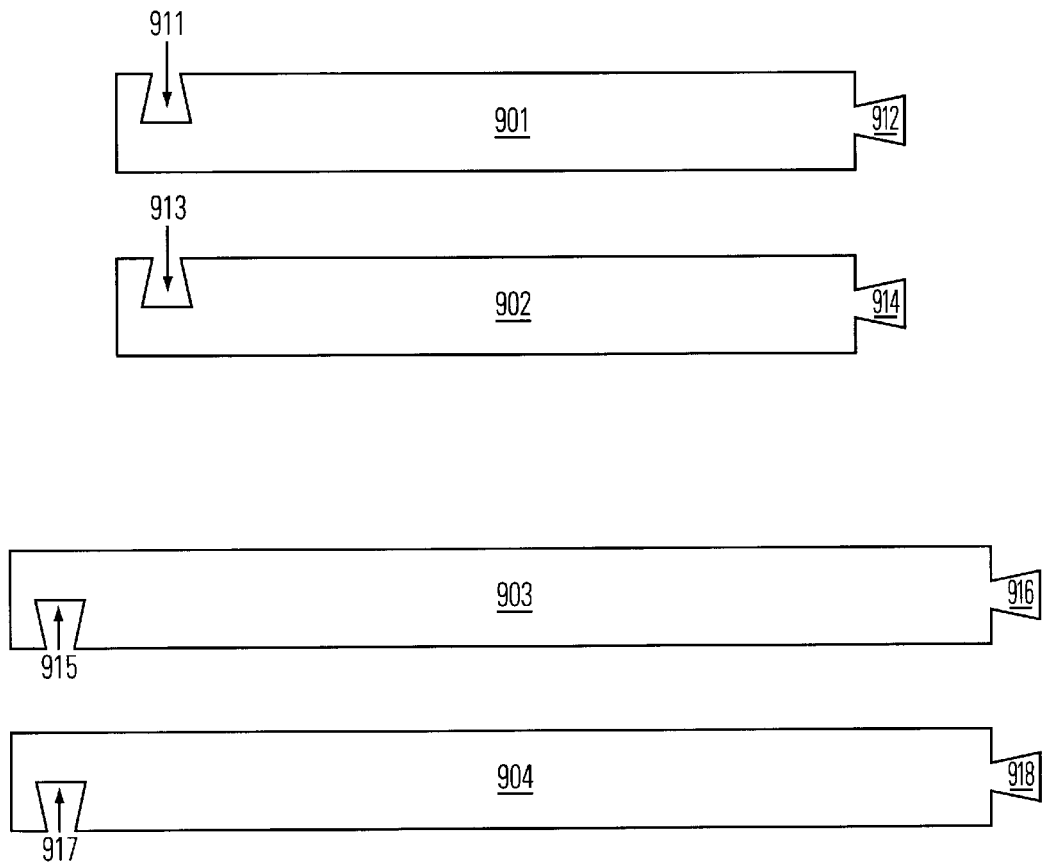
FIG. 9 is a top view of seal material bars having joining features that are angled pegs and angled slots in accordance with the present claimed invention.
Figure 10:
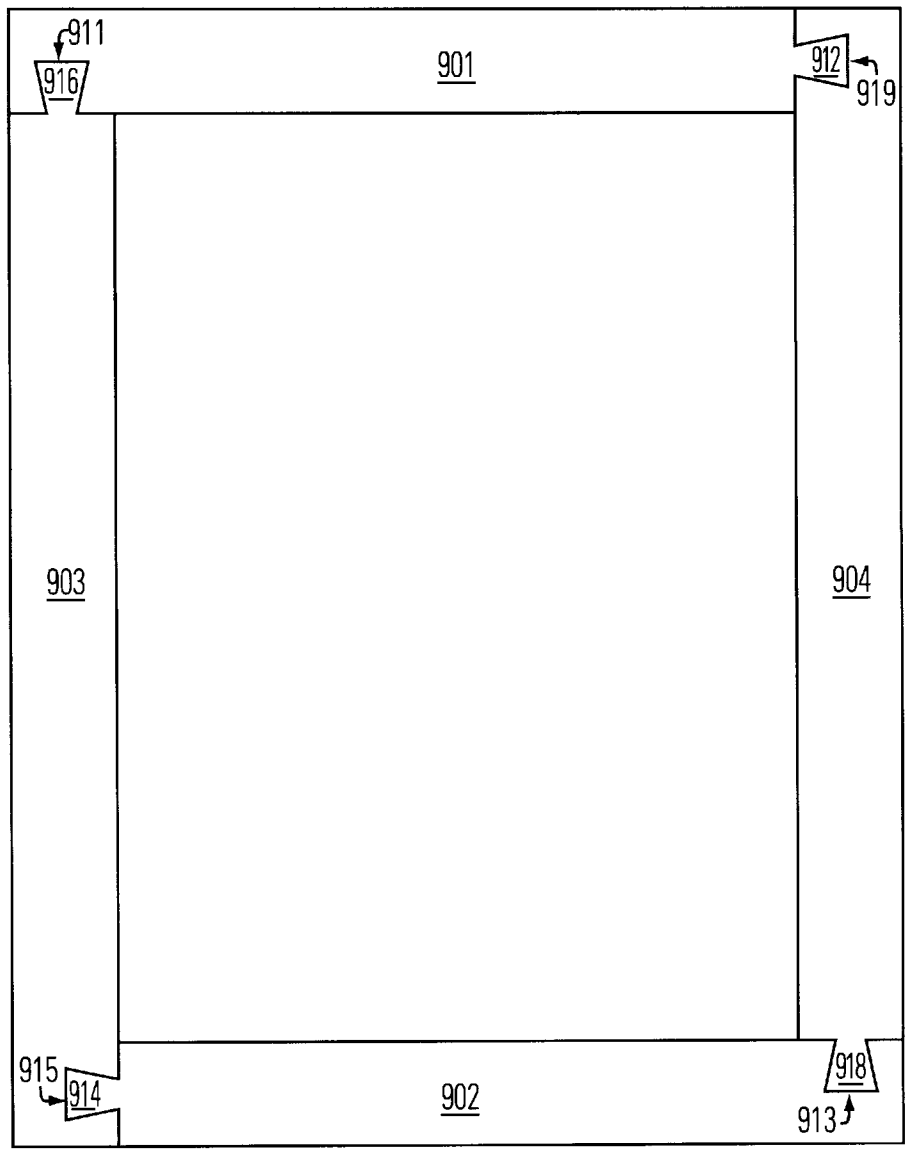
FIG. 10 is top view of a seal material frame formed using seal material bars having joining features that are angled pegs and angled slots in accordance with the present claimed invention.

Referring now to FIG. 9, seal material bars 901–904 are shown to include joining features on or near each end of each seal material bar. More specifically, seal material bars 901 and 902 are shown to include a joining feature on one end that is a male joint and a joining feature near the other end that is a female joint. That is, seal material bar 901 is shown to include female joint 911 near one end and male joint 912 on the opposite end. Similarly, seal material bar 902 is shown to include female joint 913 near one end and male joint 914 on the opposite end. Continuing with FIG. 9, seal material bars 903 and 904 are shown to include a joining feature on one end that is a male joint and a joining feature near the other end that is a female joint. More particularly, seal material bar 903 is shown to include female joint 915 near one end and male joint 916 on the opposite end. Similarly, seal material bar 904 is shown to include a female joint 917 near one end and a male joint 918 on the opposite end. Each of male joints 912, 914, 916, and 918 are angled so as to form an angled peg that has a dovetail shape. Similarly, each of female joints 911, 913, 915, and 917 are tapered so as to form an angled slot that has a dovetail shape.

Seal material bars 901–904 of FIG. 9 are assembled as shown in FIG. 10 to form seal material frame 1001. Seal material bars 901–904 are placed together such that each of male joints 912, 914, 916, and 918 is inserted into ones of female joints 911, 913, 915, and 917. More specifically, in the embodiment shown in FIG. 10, one end of seal material bar 903 is shown to be attached to seal material bar 901 (male joint 916 and female joint 911 are connected together), and the other end is shown to be attached to seal material bar 902 (male joint 914 and female joint 915 are connected together). Similarly, one end of seal material bar 904 is attached to seal material bar 901 (male joint 912 and female joint 917 are connected together) and the other end is shown to be attached to seal material bar 902(male joint 918 and female joint 913 are connected together).

Figure 11:
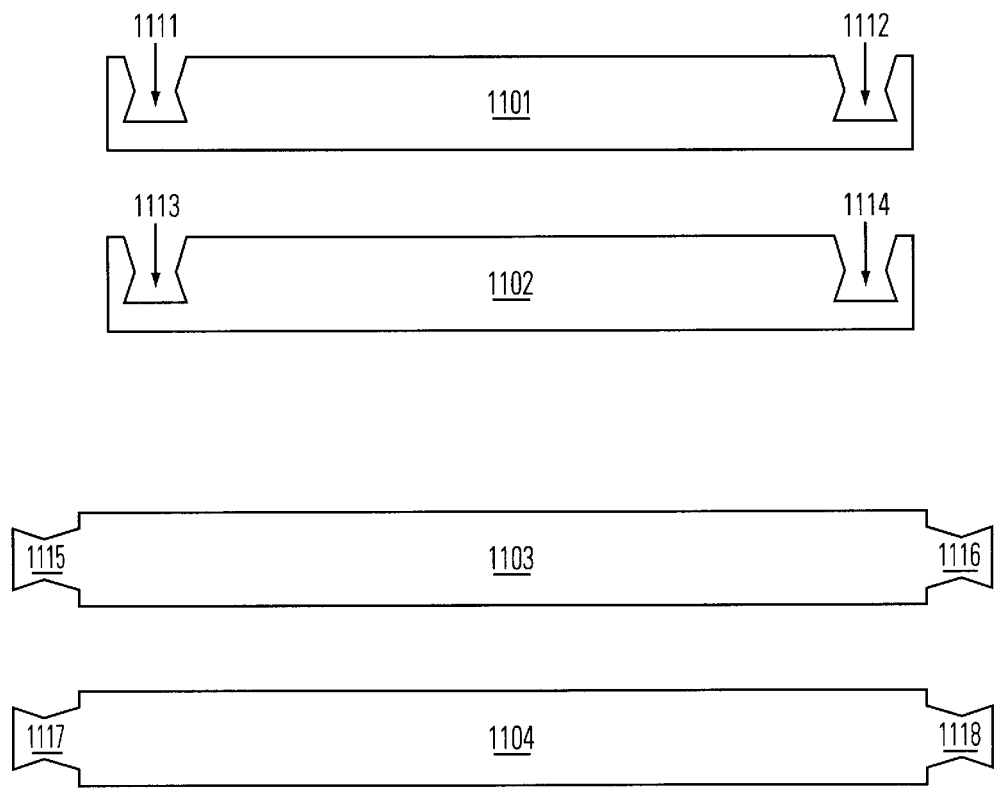
FIG. 11 is a top view of seal material bars having joining features that are re-entrant angled pegs and re-entrant angled slots in accordance with the present claimed invention.
Figure 12:
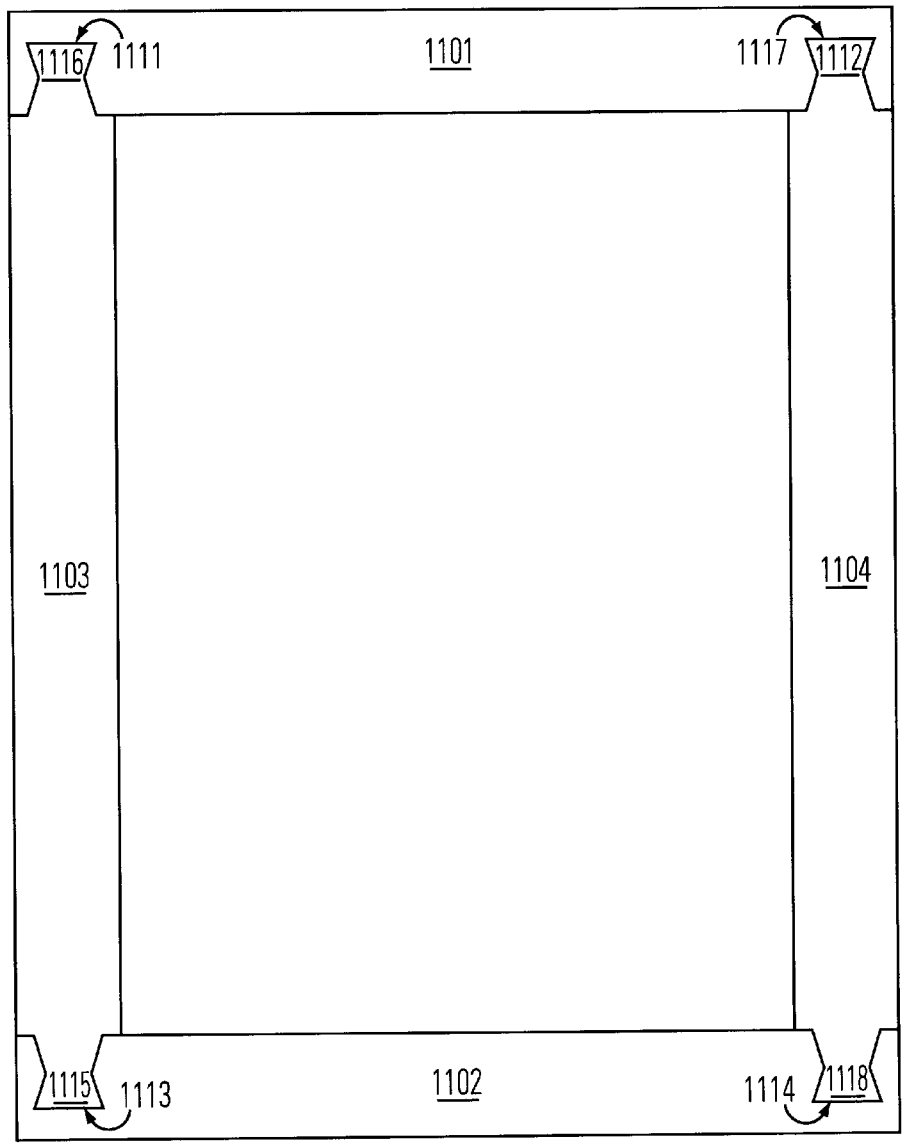
FIG. 12 is top view of a seal material frame formed using seal material bars having joining features that are re-entrant angled pegs and re-entrant angled slots in accordance with the present claimed invention.

In the embodiment shown in FIGS. 11–12, a seal material frame is formed using joining features that are re-entrant angle joints. In one embodiment, each re-entrant angle male joint is a re-entrant angle peg and each re-entrant angle female joining is a re-entrant angle slot. Referring now to FIG. 11, re-entrant angle female joints 1111–1114 are formed near each end of seal material bars 1101–1102. Corresponding re-entrant angle male joints 1115–1118 are formed on each end of seal material bars 1103–1104.

Seal material bars 1101–9011 of FIG. 11 are assembled as shown in FIG. 12 to form seal material frame 1201. Seal material bars 1101–1104 are placed together such that each of male joints 1115–1118 is inserted into ones of female joints 1111–1114. More specifically, in the embodiment shown in FIG. 12, one end of seal material bar 1103 is attached to seal material bar 1101 (male joint 1116 and female joint 1111 are connected together), and the other end is attached to seal material bar 1102 (male joint 1115 and female joint 1113 are connected together). Similarly, one end of seal material bar 1104 is attached to seal material bar 1101 (male joint 1117 and female joint 1112 are connected together) and the other end is attached to seal material bar 1102 (male joint 1118 and female joint 1114 are connected together).

FIGS. 13–14 show an embodiment in which corner pieces are used to form joints. In the embodiment shown in FIG. 13, corner piece 1301 is shown to include female joints 1311–1312 that are slots. Seal material bars 1302 and 1303 are shown to include a joining feature on each end. More specifically, male joints 1313 and 1314 are pegs that extend from either end of seal material bar 1302 and male joints 1315 and 1316 are pegs that extend from each end of seal material bar 1303.

Referring now to FIG. 14, a frit frame formed using four of corner joint 1301 and two of each of frit bars 1302 and 1303 of FIG. 13 is shown. Each of male joints 1313–1316 mates with one of female joints 1311–1312 so as to form a frame-shape. This embodiment provides corners that are more robust since the corner itself is a solid piece of seal material. In addition, corners may be accurately positioned during the seal material frame assembly process; thereby providing a tighter control of frame assembly dimensions.

In one embodiment, corner joint 1301 and seal material bars 1302–1303 of FIGS. 13–14 are formed by stamping, dicing or cutting a rectangular seal material bar or a length of extruded seal material using the method described in FIG. 1b. Alternatively, a prior art process such as lamination may be used to form a block of glass frit that is then stamped, diced or cut into the required shape. In an alternate embodiment (not shown), the joining features of seal material bars 1302–1303 and seal material corner pieces 1301 are angled joints. Alternatively, re-entrant angled joints are used.

Figure 15:
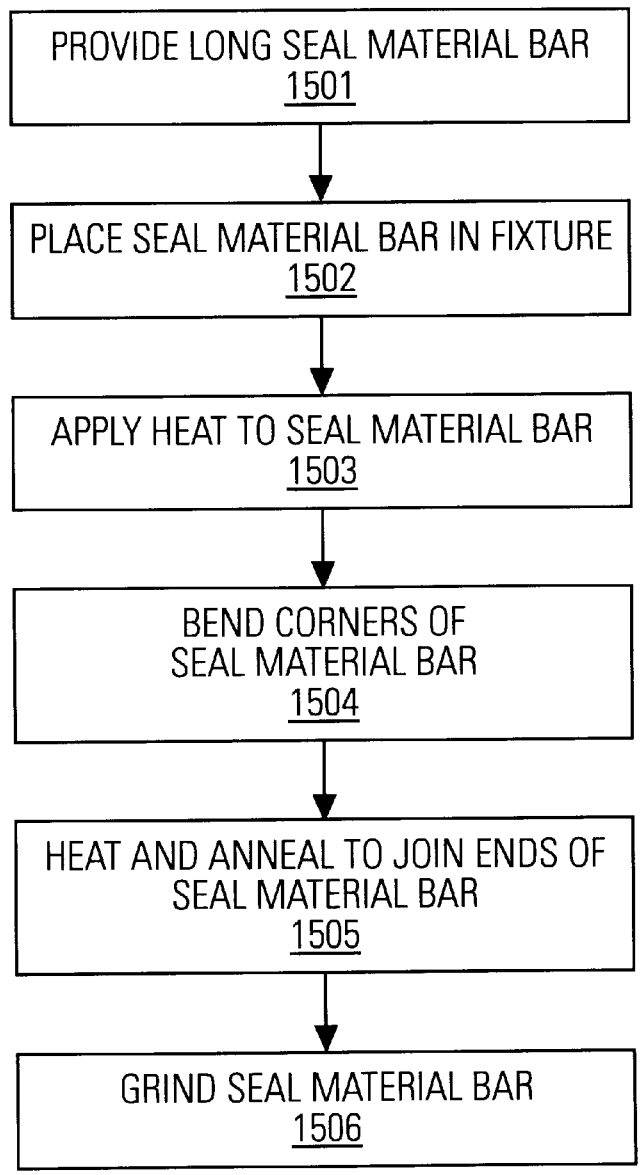
FIG. 15 is a diagram illustrating a method for forming a seal material frame using a single seal material bar in accordance with one embodiment of the present invention.
Figure 16:
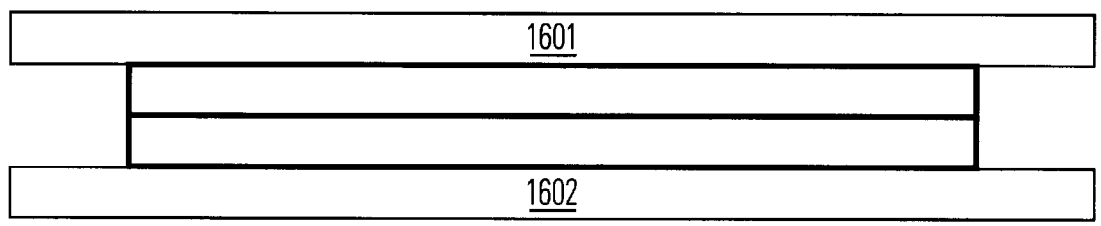
FIG. 16 is a side view of a clamshell fixture used for forming a seal material frame in accordance with one embodiment of the present claimed invention.
Figure 17:
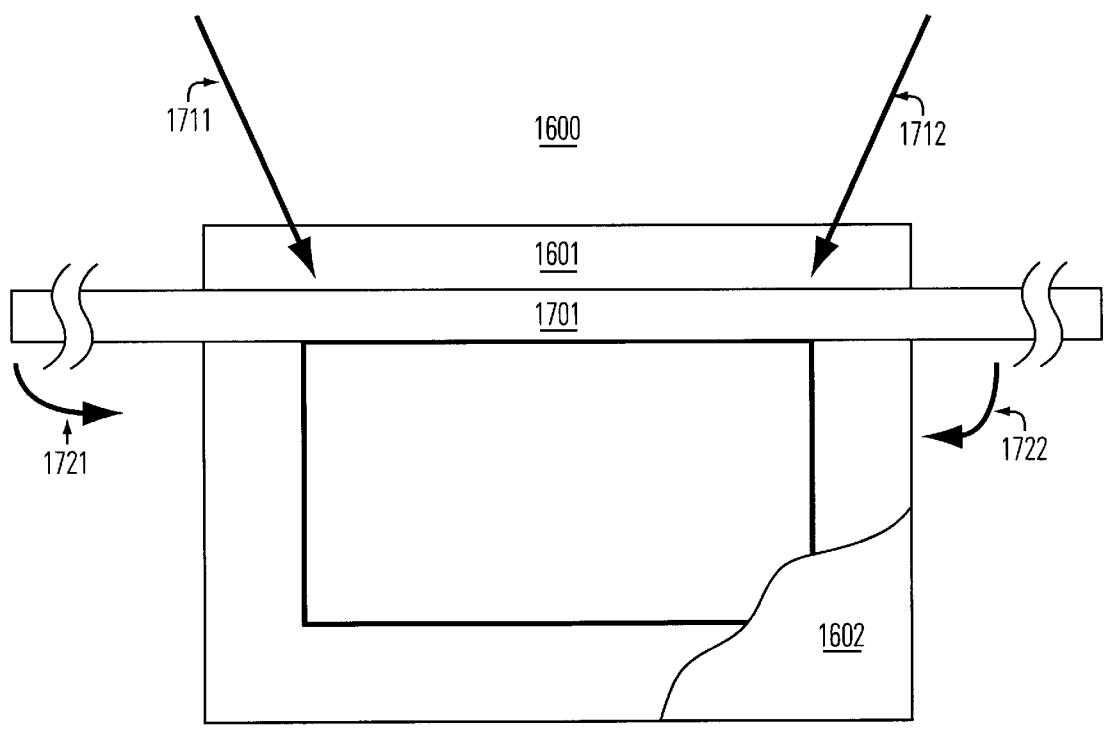
FIG. 17 is a cut away top view of a clamshell fixture having a seal material bar disposed therein in accordance with one embodiment of the present claimed invention.

In an alternate embodiment that is illustrated in FIGS. 15–20, a seal material frame is formed using a single seal material bar. Referring now to FIG. 15, a long seal material bar is provided, as shown by step 1501. In one embodiment, a seal material bar that is formed according to the method described in FIG. 1a is used. Alternatively, a long seal material bar formed using prior art fabrication methods may be used. The seal material bar is placed into a fixture as shown by step 1502. FIG. 16 shows an example of a clamshell fixture 1600 that includes top plate 1601 and bottom plate 1602. FIG. 17 shows an example of a seal material bar 1701 that is placed into fixture 1600 such that it is disposed between top plate 1601 and bottom plate 1602.

Figure 18:
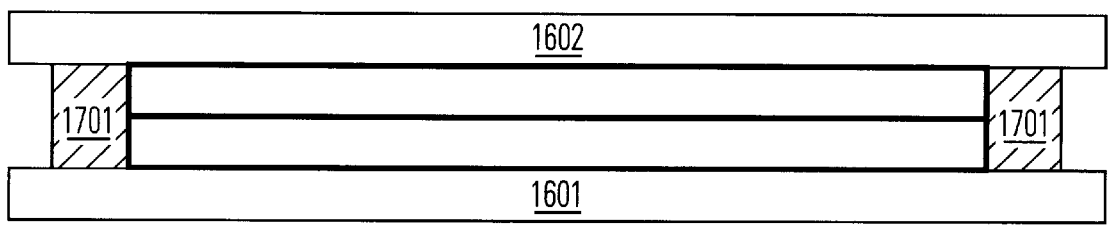
FIG. 18 is a side view of a clamshell fixture having a seal material bar disposed therein after two corners have been formed in accordance with the present claimed invention.
Figure 19:
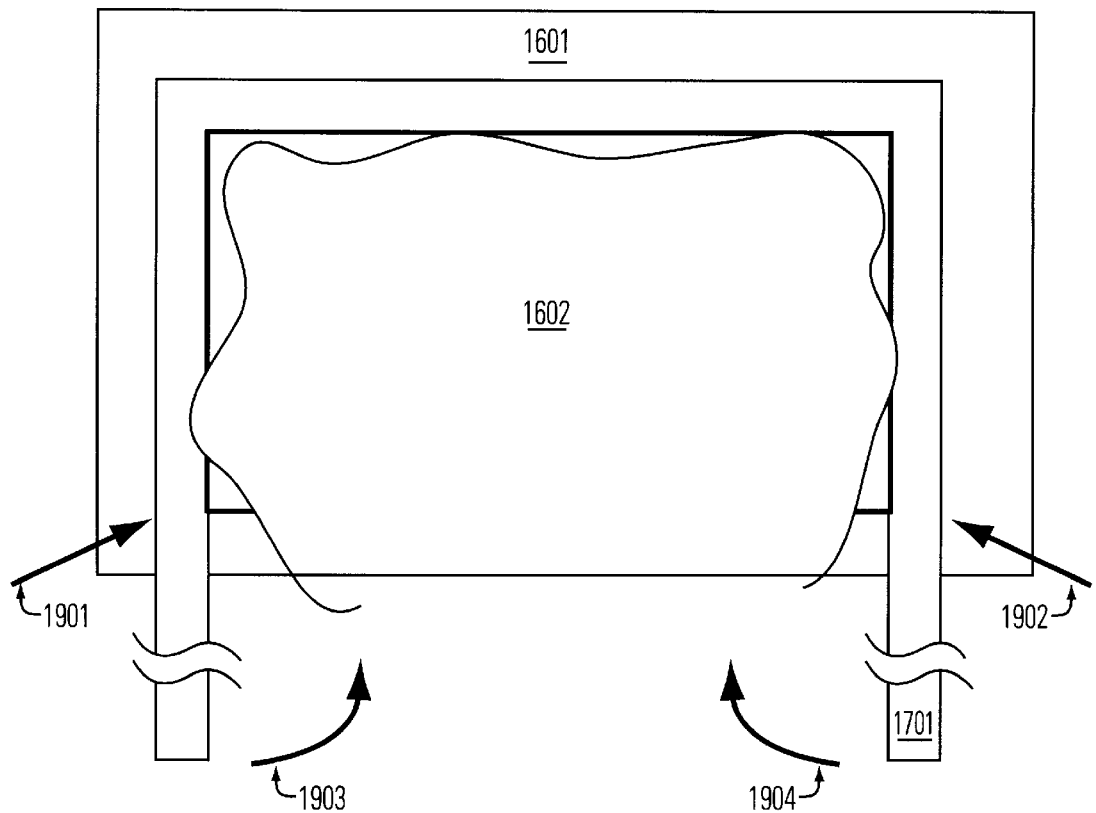
FIG. 19 is a cut away top view of a clamshell fixture having a seal material bar disposed therein after two corners have been formed in accordance with the present claimed invention.
Figure 20:
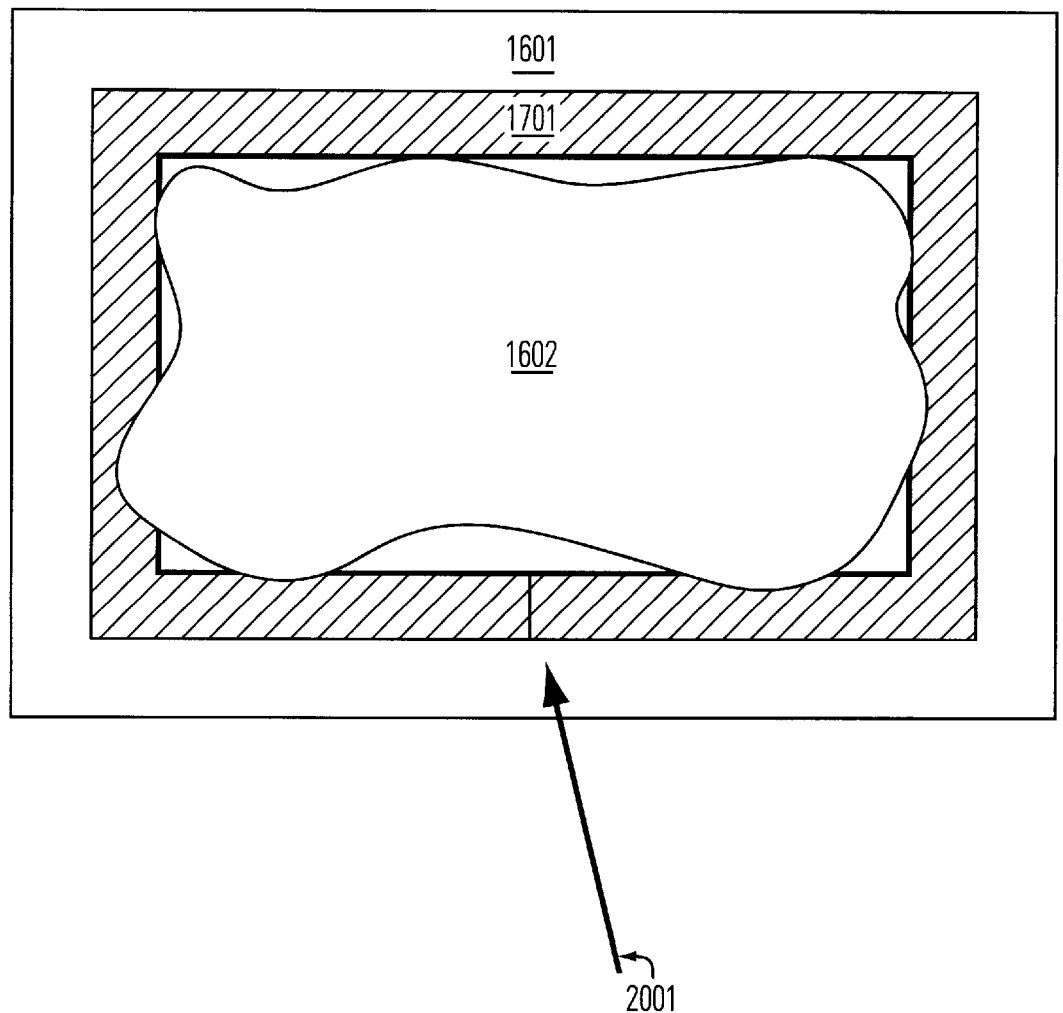
FIG. 20 is a cut away top view of a clamshell fixture having a seal material bar disposed therein after four corners have been formed in accordance with the present claimed invention.

Continuing with FIG. 15, heat is applied to the seal material bar as shown by step 1503. In the embodiment shown in FIG. 17, local heating is applied as shown by arrows 1711–1712 to heat portions of the seal material bar 1701. Then, as shown by step 1504 of FIG. 15, corners are bent into the seal material bar. In the embodiment shown in FIG. 17, seal material bar 1701 is bent as shown by arrows 1721 and 1722 to form corners at each of heated areas shown by arrows 1711–1712. The resulting assembly is shown in FIG. 18. The process of heating (step 1503) and bending (step 1504) is continued until all required corners are formed. In the embodiment shown in FIG. 19, seal material bar 1701 is locally heated at the locations indicated by arrows 1901–1902 and seal material bar 1701 is bent as shown by arrows 1903–1904 to form the structure shown in FIG. 20. Seal material bar 1701 is shown to include four corners so as to form a frame-shaped seal material bar.

Continuing with FIG. 15, heat is applied so as to join the ends of the seal material bar as is shown by step 1505. This process also anneals the ends of the seal material bar. In the embodiment shown in FIG. 20, a local heat source is applied as shown by arrow 2001.

The local heat source applied as shown by arrows 1711–1712 and 1901–1902 and 2001 may be a laser, hot air, or localized microwave energy. In one embodiment, heat sources are placed into fixture 1600 of FIG. 16 so as to provide the required heating by locally heating the surfaces of fixture 1600.

In an alternate embodiment, the entire assembly is heated using a general heating process. In one embodiment, the seal material bar is heated in an oven using a fixture that bends the seal material bar into the desired shape. In one embodiment (not shown) the fixture attaches to one end of the seal material bar and rotates, using gravity so as to sequentially form each of the required corners.

In one embodiment, as shown by step 1506, the seal material bar is ground to the desired height. This grinding process is used to maintain uniform height across the seal material frame. This is often needed because the height of the frame at each corner is typically increased by the forming process. In one embodiment, the frame is placed into a grinding fixture. The top of the frame is first ground to obtain a flat top surface. Then, the bottom of the frame is ground to obtain the desired height.

In an alternate embodiment (not shown), the dimensions of the bar of seal material are reduced at each corner prior to placement of the long seal material bar into the fixture. This reduces the nonuniformities in height at each corner and eliminates the need for grinding.

The frame shown in FIGS. 15–20 has only a single joint. This reduces the potential for leakage due to trapped air. In addition, process cycle time is reduced since multiple seal material bars need not be assembled. When localized heating sources are exclusively used, because the entire frame is not heated, the problem of the frame sticking to the fixture is eliminated. This allows for a wider choice of materials for forming a fixture.

Figure 21:
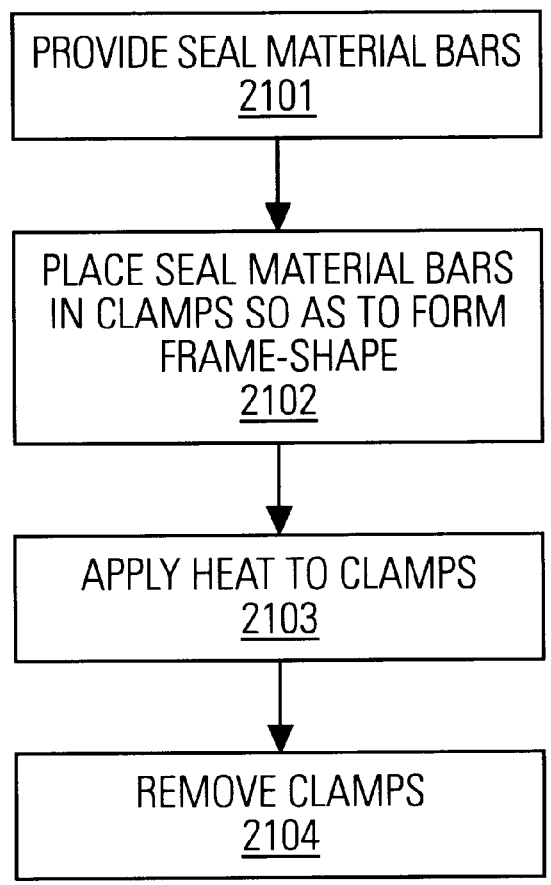
FIG. 21 is a diagram showing a method of forming a seal material frame in accordance with the present claimed invention.

In one embodiment, seal material bars are joined by a localized heating process as shown in FIG. 21. Seal material bars are provided as shown by step 2101. The seal material bars are clamped together so as to form a frame-shape as shown by step 2102. Heat is applied locally to each clamp as shown by step 2103 so as to join adjoining seal material bars. The clamps are then removed as shown by step 2104.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for forming a bar of seal material comprising:
   a.) providing glass frit;
   b.) providing organic compound;
   c.) mixing said glass frit and said organic compound to form a seal material;
   d.) extruding said seal material so as to form a seal material shape; and
   e.) cutting said seal material shape to form a seal material bar.

2. The method for forming a bar of seal material as recited in claim 1 further comprising the step of:
   f.) heating said seal material bar to remove said organic compound.

3. The method for forming a bar of seal material as recited in claim 2 wherein said seal material shape is a rectangular shape.

4. The method for forming a bar of seal material as recited in claim 2 wherein step f.) further comprises heating said seal material bar in an oven so as to remove said organic compound, said step of heating said bar of seal material removing substantially all of said organic compound so as produce said bar of seal material having a organic compound content of less than or equal to 30 parts per million.

5. The method for forming a bar of seal material as recited in claim 2 wherein step d.) further comprises producing a thin seal material shape such that the surface area exposed in said heating step is increased, and such that the amount of organic compound removed in said heating step is increased.

6. The method for forming a bar of seal material as recited in claim 1 wherein step d.) further comprises applying pressure to said seal material such that said seal material is forced through a restricted opening, and such that said seal material is compacted as it is forced through said restricted opening to form said seal material shape.

7. The method for forming a bar of seal material as recited in claim 4 further comprising the step of:
   f.) drying said seal material shape.

8. The method for forming a bar of seal material as recited in claim 1 further comprising the step of:
   aging said seal material; and
   removing air from said seal material.

9. The method for forming a bar of seal material as recited in claim 1 wherein step e.) further comprises selectively cutting said seal material shape so as to form a bar of seal material having joining features.

10. The method for forming a bar of seal material as recited in claim 1 wherein step e.) further comprises stamping said seal material shape so as to form a bar of seal material having joining features.

11. A seal material bar comprising:
    an elongated body having a first end and a second end;
    a male joining feature extending from said first end of said elongated body; and
    a female joining feature proximate said second end of said elongated body, said female joining feature adapted to receive a corresponding male joining feature.

12. The seal material bar as recited in claim 11 wherein said male joining feature is a peg and said female joining feature is a slot.

13. The seal material bar as recited in claim 11 wherein said male joining feature is an angled peg and wherein said female joining feature is an angled slot.

14. The seal material bar as recited in claim 11 wherein said male joining feature is a re-entrant angled peg and said female joining feature is a re-entrant angled slot.

15. The seal material bar as recited in claim 11 wherein said seal material bar is formed using an extrusion process, and wherein said male and said female joining features are formed by cutting said seal material bar.

16. The seal material bar as recited in claim 11 wherein said seal material bar is formed using an extrusion process, and wherein said male and said female joining features are formed by stamping said seal material bar.

17. The seal material bar as recited in claim 11 wherein said seal material bar is formed using an extrusion process such that said elongated body has a rectangular cross section.

18. The seal material bar as recited in claim 11 further comprising glass frit formed using a lamination process.

19. The seal material bar as recited in claim 11 further comprising ceramic material.

20. The seal material bar as recited in claim 11 further comprising glass frit formed using an extrusion process.

21. A seal material bar comprising:
    an elongated body having a first end and a second end;
    a first male joining feature extending from said first end of said elongated body; and
    a second male joining feature extending from said second end of said elongated body.

22. The seal material bar as recited in claim 21 wherein said first male joining feature and said second male joining feature are pegs.

23. The seal material bar as recited in claim 21 wherein said first male joining feature and said second male joining feature are angled pegs.

24. The seal material bar as recited in claim 21 wherein said first male joining feature and said second male joining feature are re-entrant angled pegs.

25. The seal material bar as recited in claim 21 wherein said elongated body has a rectangular shaped cross section.

26. The seal material bar as recited in claim 21 further comprising glass frit formed using a lamination process.

27. The seal material bar as recited in claim 21 further comprising ceramic material.

28. The seal material bar as recited in claim 21 further comprising glass frit formed using an extrusion process.

29. A seal material bar comprising:
   an elongated body having a first end and a second end;
   a first female joining feature near said first end of said elongated body; and
   a second female joining feature near said second end of said elongated body.

30. The seal material bar as recited in claim 29 wherein said first female joining feature and said second female joining feature further comprise slots.

31. The seal material bar as recited in claim 29 wherein said first female joining feature and said second female joining feature further comprise angled slots.

32. The seal material bar as recited in claim 29 wherein said first female joining feature and said second female joining feature further comprise re-entrant angled slots.

33. The seal material bar as recited in claim 29 wherein said elongated body has a rectangular shaped cross section.

34. The seal material bar as recited in claim 29 wherein said elongated body has an organic compound content of less than or equal to 30 parts per million.

35. The seal material bar as recited in claim 29 further comprising glass frit formed using a lamination process.

36. The seal material bar as recited in claim 29 further comprising ceramic material.

37. The seal material bar as recited in claim 29 further comprising glass frit formed using an extrusion process.

38. A method for forming a seal material frame comprising;
   a.) disposing a plurality of seal material bars so as to form a frame-shape;
   b.) disposing glass frit slurry between adjoining seal material bars; and
   c.) heating said seal material bars and said glass frit slurry so as to form an assembled seal material frame.

39. The method for forming a seal material frame as recited in claim 38 wherein said glass frit slurry melts prior to said seal material bars so as to hold said seal material bars in place.

40. A seal material frame comprising;
   a plurality of seal material bars having joining features formed proximate each end, said plurality of seal material bars disposed so as to form a frame-shape, said joining features on adjoining ones of said plurality of seal material bars engaged so as to hold said plurality of seal material bars in said frame-shape.

41. The seal material frame as recited in claim 40 wherein said seal material bars comprises glass frit formed using a lamination process.

42. The seal material frame as recited in claim 40 wherein said seal material bars comprise ceramic material.

43. The seal material frame as recited in claim 40 wherein said seal material bars comprise glass frit formed using an extrusion process.

44. A method for forming a seal material frame comprising:
   a.) disposing a plurality of seal material bars having joining features formed proximate each end so as to form a frame-shape, said joining features on adjoining ones of said plurality of seal material bars engaged so as to hold said plurality of seal material bars in said frame-shape; and
   b.) heating said plurality of seal material bars so as to form a seal material frame.

45. The method for forming a seal material frame as recited in claim 44 wherein said joining features comprise female joining features and male joining features, said female joining features adapted to mate with said male joining features, and wherein said male joining features are pegs and said female joining features are slots.

46. The method for forming a seal material frame as recited in claim 44 wherein said joining features comprise female joining features and male joining features, said female joining features adapted to mate with said male joining features, and wherein said male joining features are angled pegs and said female joining features are angled slots.

47. The method for forming a seal material frame as recited in claim 44 wherein said joining features comprise female joining features and male joining features, said female joining features adapted to mate with said male joining features, and wherein said male joining features are re-entrant angled pegs and said female joining features are re-entrant angled slots.

48. The method for forming a seal material frame as recited in claim 44 wherein said seal material bars comprises glass frit formed using a lamination process.

49. The method for forming a seal material frame as recited in claim 44 wherein said seal material bars comprise ceramic material.

50. The method for forming a seal material frame as recited in claim 44 wherein said seal material bars comprise glass frit formed using an extrusion process.

51. A seal material frame comprising:
   a plurality of seal material bars having joining features formed therein; and
   a plurality of seal material corner pieces having joining features formed therein adapted to mate with said joining features of said seal material bars, ones of said plurality of seal material corner pieces coupled to ones of said plurality of said seal material bars so as to form a frame-shape.

52. The seal material frame as recited in claim 51 wherein said joining features comprise female joining features and male joining features, said female joining features adapted to mate with said male joining features, and wherein said male joining features are pegs and said female joining features are slots.

53. The seal material frame as recited in claim 51 wherein said joining features comprise female joining features and male joining features, said female joining features adapted to mate with said male joining features, and wherein said male joining features are angled pegs and said female joining features are angled slots.

54. The seal material frame as recited in claim 51 wherein said joining features comprise female joining features and male joining features, said female joining features adapted to mate with said male joining features, and wherein said male joining features are re-entrant angled pegs and said female joining features are re-entrant angled slots.

55. The seal material frame as recited in claim 51 wherein said seal material bars and said seal material corner pieces further comprise glass frit formed using a lamination process.

56. The seal material frame as recited in claim 51 wherein said seal material bars and said seal material corner pieces further comprise ceramic material.

57. The seal material frame as recited in claim 51 wherein said seal material bars and said seal material corner pieces further comprise glass frit formed using an extrusion process.

58. A method for forming a seal material frame comprising:
   a.) providing a plurality of seal material bars having joining features formed therein;
   b.) providing a plurality of seal material corner pieces, each of said seal material corner pieces having joining features formed therein adapted to mate with said joining features in ones of said plurality of seal material bars;
   c.) disposing ones of said plurality of seal material bars and ones of said plurality of seal material corner pieces so as to form a frame-shape, the joining features of ones of said plurality of seal material bars engaging the joining features of ones of said plurality of seal material corner pieces so as to hold said seal material corner pieces and said seal material bars in said frame-shape; and
   d.) heating said seal material bars and said seal material corner pieces so as to form a seal material frame.

59. The method for forming a seal material frame as recited in claim 58 wherein said seal material bars and said seal material corner pieces further comprise glass frit formed using a lamination process.

60. The method for forming a seal material frame as recited in claim 58 wherein said seal material bars and said seal material corner pieces further comprise ceramic material.

61. The method for forming a seal material frame as recited in claim 58 wherein said seal material bars and said seal material corner pieces further comprise glass frit formed using an extrusion process.

62. A method for forming a thin flat panel display comprising:
   a.) forming a faceplate including an active area having luminescent generating material disposed thereon;
   b.) forming a backplate including an active area that includes electron emitting structures;
   c.) disposing a plurality of seal material bars between said backplate and said faceplate such that said plurality of seal material bars are disposed around said active area of said backplate and around said active area of said faceplate;
   d.) disposing glass frit slurry between adjoining seal material bars;
   e.) applying heat to said seal material bars and said glass frit slurry such that said glass frit bonds said faceplate to said backplate so as to form an enclosure;
   f.) evacuating said enclosure; and
   g.) sealing said enclosure.

63. The method for forming a thin flat panel display as recited in claim 62 wherein said seal material bars further comprise glass frit formed using a lamination process.

64. The method for forming a thin flat panel display as recited in claim 62 wherein said seal material bars further comprise ceramic material.

65. The method for forming a thin flat panel display as recited in claim 62 wherein said seal material bars further comprise glass frit formed using an extrusion process.

66. A method for forming a thin flat panel display comprising:
   a.) forming a faceplate including an active area having luminescent generating material disposed thereon;
   b.) forming a backplate including an active area that includes electron emitting structures;
   c.) disposing a plurality of seal material bars that include joining features such that said joining features are mated, said plurality of seal material bars disposed around said active area of said backplate and around said active area of said faceplate;
   d.) applying heat to said seal material bars such that said seal material bars melt, bonding said faceplate to said backplate so as to form a display assembly including an enclosure;
   e.) evacuating said enclosure of said display assembly; and
   f.) sealing said enclosure of said display assembly.

67. The method for forming a thin flat panel display as recited in claim 66 wherein said seal material bars further comprise glass frit formed using a lamination process.

68. The method for forming a thin flat panel display as recited in claim 66 wherein said seal material bars further comprise ceramic material.

69. The method for forming a thin flat panel display as recited in claim 66 wherein said seal material bars further comprise glass frit formed using an extrusion process.

70. A method for forming a seal material frame comprising:
   a.) providing a seal material bar;
   b.) heating said seal material bar; and
   c.) bending said seal material bar so as to form a frame-shape.

71. The method for forming a seal material frame as recited in claim 70 wherein step b.) further comprises locally applying heat to portions of said seal material bar.

72. The method for forming a seal material frame as recited in claim 71 wherein step c.) further comprises bending said seal material bar where heat is locally applied.

73. The method for forming a seal material frame as recited in claim 70 wherein said seal material bar has a first end and a second end, said method further comprising the step of:
   d.) heating said first end and said second end so as to join said first end to said second end.

74. A method for forming a seal material frame comprising:
   a.) providing a seal material bar having a first end and a second end;
   b.) locally heating said seal material bar so as to form a first heated region;
   c.) bending said seal material bar so as to form a corner at said first heated region;
   d.) locally heating said seal material bar so as to form a second heated region;
   e.) bending said seal material bar so as to form a corner at said second heated region;
   f.) locally heating said seal material bar so as to form a third heated region;
   g.) bending said seal material bar so as to form a corner at said third heated region;
   h.) locally heating said seal material bar so as to form a fourth heated region;
   i.) bending said seal material bar so as to form a corner at said fourth heated region; and
   j.) heating said seal material bar so as to join said first end and said second end of said seal material bar.

75. The method for forming a seal material frame as recited in claim 74 wherein said seal material bar further comprises glass frit formed using a lamination process.

76. The method for forming a seal material frame as recited in claim 74 wherein said seal material bar further comprises ceramic material.

77. The method for forming a seal material frame as recited in claim 74 wherein said seal material bar further comprises glass frit formed using an extrusion process.

78. A method for forming a seal material frame comprising the steps of:

provided seal material;

extruding said seal material into a hollow rectangular shape so as to form a seal material shape; and cutting said seal material shape so as to form a frame-shape.

79. The method for forming a frame-shape of claim 78 further comprising the step of:

grinding said frame-shape so as to form a seal material frame having the desired thickness.

80. The method for forming a frame-shape of claim 78 wherein said seal material further comprises glass frit, said method for forming a frame-shape further comprising the step of:

allowing said seal material shape to dry.

81. The method for forming a frame-shape of claim 78 wherein said seal material further comprises glass frit, said method for forming a frame-shape further comprising the step of:

heating said frame-shape so as to remove organic compound.

82. The method for forming a frame-shape of claim 78 wherein said seal material further comprises ceramic material.

83. A method for forming a seal material frame comprising:

providing seal material bars;

clamping said seal material bars into a frame-shape using a plurality of clamps; and applying heat to said clamps so as to join adjoining seal material bars into a seal material frame.

* * * * *